(12) United States Patent
Hiroi et al.

(10) Patent No.: US 10,353,489 B2
(45) Date of Patent: Jul. 16, 2019

(54) FOOT INPUT DEVICE AND HEAD-MOUNTED DISPLAY DEVICE

(71) Applicant: SEIKO EPSON CORPORATION, Tokyo (JP)

(72) Inventors: Yoshiaki Hiroi, Matsumoto (JP); Masahide Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 229 days.

(21) Appl. No.: 15/482,118

(22) Filed: Apr. 7, 2017

(65) Prior Publication Data

US 2017/0300132 A1 Oct. 19, 2017

(30) Foreign Application Priority Data

Apr. 13, 2016 (JP) .................................. 2016-080055
Dec. 20, 2016 (JP) .................................. 2016-246192

(51) Int. Cl.
| | |
|---|---|
| *G09G 5/00* | (2006.01) |
| *G06F 3/033* | (2013.01) |
| *A43B 3/00* | (2006.01) |
| *G06F 1/16* | (2006.01) |
| *G06F 3/01* | (2006.01) |
| *G06F 3/0338* | (2013.01) |

(52) U.S. Cl.
CPC .......... *G06F 3/0334* (2013.01); *A43B 3/0005* (2013.01); *A43B 3/0015* (2013.01); *G06F 1/163* (2013.01); *G06F 3/011* (2013.01); *G06F 3/0338* (2013.01)

(58) Field of Classification Search
CPC ...... G06F 3/0334; G06F 3/0338; G06F 3/033; G06F 3/011
See application file for complete search history.

(56) References Cited

U.S. PATENT DOCUMENTS

| | | | |
|---|---|---|---|
| 6,876,947 B1 * | 4/2005 | Darley ................. | A43B 3/0005 702/160 |
| 6,882,955 B1 * | 4/2005 | Ohlenbusch ......... | A43B 3/0005 702/160 |
| 7,127,401 B2 * | 10/2006 | Miller ................... | A61B 8/467 704/275 |
| 8,676,541 B2 * | 3/2014 | Schrock ................. | A43B 3/00 702/188 |
| 9,002,680 B2 * | 4/2015 | Nurse ..................... | A43B 3/00 702/182 |
| 9,565,286 B2 * | 2/2017 | Chung .................. | H04W 76/14 |

(Continued)

FOREIGN PATENT DOCUMENTS

| | | |
|---|---|---|
| JP | H08-179879 A | 7/1996 |
| JP | H10-055248 A | 2/1998 |

(Continued)

*Primary Examiner* — Vijay Shankar
(74) *Attorney, Agent, or Firm* — Oliff PLC

(57) ABSTRACT

A foot input device worn on a foot of a user and configured to output an operation signal used by an external apparatus includes an operation section configured to detect a state of a sole of the foot of the user and output the operation signal corresponding to the detected state of the sole of the foot. The operation section detects, as the state of the sole of the foot, a load received from the sole of the foot of the user and outputs the operation signal corresponding to the detected load.

22 Claims, 22 Drawing Sheets

(56) References Cited

U.S. PATENT DOCUMENTS

| | | | | |
|---|---|---|---|---|
| 9,817,473 B2* | 11/2017 | Park | .................. | G06F 3/011 |
| 2002/0128846 A1* | 9/2002 | Miller | .................. | A61B 8/467 |
| | | | | 704/275 |
| 2017/0336870 A1* | 11/2017 | Everett | .................. | G06F 3/0383 |

FOREIGN PATENT DOCUMENTS

| | | | |
|---|---|---|---|
| JP | 2001-067179 A | 3/2001 |
| JP | 2004-326713 A | 11/2004 |
| JP | 2013-072729 A | 4/2013 |
| JP | 2016-000122 A | 1/2016 |

* cited by examiner

FOOT INPUT DEVICE AND HEAD-MOUNTED DISPLAY DEVICE

BACKGROUND

1. Technical Field

The present invention relates to technique of a foot input device and a head-mounted display device.

2. Related Art

There is known a head-mounted display device (a head mounted display: HMD), which is a display device mounted on a head. For example, the HMD generates, using a liquid crystal display and a light source, an image light representing an image and causes, using projection optical systems and light guide plates, a user to visually recognize the generated image light. The HMD is a so-called wearable device worn on the body of the user.

JP-A-8-179879 (Patent Literature 1) describes a pointing device that enables a user to move a cursor displayed on a screen through operation by a foot.

JP-A-2001-67179, JP-A-2013-72729, JP-A-2016-122, JP-A-2034-326713, and JP-A-10-55248 are examples of related art.

However, in the technique described in Patent Literature 1, although the position of the cursor functioning as a display image can be changed through the operation by the foot, a space for setting the pointing device that receives the operation is necessary. The pointing device is not suitable for the wearable device.

SUMMARY

An advantage of some aspects of the invention is to solve at least a part of the problems described above, and the invention can be implemented as the following forms.

(1) According to an aspect of the invention, a foot input device worn on a foot of a user and configured to output an operation signal used by an external apparatus is provided. The foot input device includes an operation section configured to detect a state of a sole of the foot of the user and output the operation signal corresponding to the detected state of the sole of the foot.

With the foot input device according to this aspect, the user can operate the external apparatus in a hands-free state. Therefore, convenience of the user is improved. Since the foot input device is a wearable device worn on the foot of the user, a fixed setting space for the pointing device of the related art can be eliminated. It is possible to use the toot input device in a variety of environments. When the external apparatus in use is a wearable device or the like, by using the toot input device as an input device for operating the external apparatus, the convenience of the user is improved. It is possible to use the foot input device in a variety of environments.

(2) in the foot input device according to the aspect, the operation section may detect, as the state of the sole of the foot, a load received from the sole of the foot of the user and output the operation signal corresponding to the detected load.

With the foot input device according to this aspect, it is possible to detect, as the state of the sole of the foot, the load received from the sole of the foot of the user and output the operation signal corresponding to the detected load. Therefore, the user can operate the external apparatus in the hands-free state. The convenience of the user is improved.

(3) In the foot input device according to the aspect, the operation section may detect a distribution of the load in a predetermined detection range of the sole of the foot and output the operation signal corresponding to a change in the detected distribution of the load.

With the foot input device according to this aspect, it is possible to detect the distribution of the load in the predetermined detection range of the sole of the foot and output the operation signal corresponding to the change in the detected distribution, of the load. Therefore, the user can operate the external apparatus in the hands-free state. The convenience of the user is improved.

(4) In the foot input device according to the aspect, the foot input device may further include: a right-foot-load detecting section configured to detect a right load received from a sole of a right foot of the user; and a left-foot-load detecting section configured to detect a left load received from a sole of a left foot of the user. The operation section may output the operation signal corresponding to a change in the right load and a change in the left load.

With foot input device according to the aspect, by changing the load applied to the right foot and a load applied to the left foot, it is possible to output the operation signal corresponding to the change in the right load and the change in the left load. Therefore, the user can operate the external apparatus in the hands-free state. The convenience of the user is improved.

(5) In the foot input device according to the aspect, the right-foot-load detecting section may detect a distribution of the right load, the left-foot-load detecting section may detect a distribution of the left load, and the operation section may output the operation signal corresponding to the distribution of the right load and the distribution of the left load.

With the foot input device according to this aspect, by changing the load applied to the right foot and the load applied to the left foot, it is possible to output the operation signal corresponding to the distribution of the right load and the distribution of the left load. Therefore, the user can operate the external apparatus in the hands-free state. The convenience of the user is improved.

(6) In the foot input device according to the aspect, the right-foot-load detecting section and the left-foot-load detecting section may have a function of detecting a change in a position of the right foot and a change in a position of the left foot, and the operation section may output the operation signal corresponding to the changes in the positions of the right foot and the left foot.

With the foot input device according to this aspect, the user can output the operation signal corresponding to the changes in the positions of the right foot and the left foot by changing a positional relation between the right foot and the left foot. Therefore, the user can operate the external apparatus in the hands-free state. The convenience of the user is improved.

(7) In the foot input device according to the aspect, the operation signal may be a signal for changing a position of a pointer in an image displayed on an image display section of the external apparatus.

With the foot input device according to this aspect, the user can change, in the hands-free state, the position of the pointer in the image displayed on the image display section of the external apparatus. The convenience of the user is improved.

(8) In the foot input device according to the aspect, the operation signal may be a signal for setting a display image displayed on an image display section of the external apparatus.

With the foot input device according to this aspect, the user can set, in the hands-free state, the display image displayed on the image display section of the external apparatus. The convenience of the user is improved.

(9) In the foot input device according to the aspect, the operation section may include: a two-kind operation section worn on a first foot, which is one of a left foot and a right foot of the user, and configured to detect, as the state of the sole of the foot, a distribution of a load received from a sole of the first foot and output two kinds of operation signals, that is, a first operation signal and a second operation signal according to a change in the detected distribution of the load; and a one-kind operation section worn on a second foot, which is the other of the left foot and the right foot of the user, and configured to detect, as the state of the sole of the foot, a tilt of a sole of the second foot and output a third operation signal different from the two kinds of operation signals according to a change in the tilt.

With the foot input device according to this aspect, by changing a load by the first foot and changing a tilt of the second foot, the user can output three kinds of operation signals according to a change in a distribution of the load and a change in a tilt of the sole of the foot. Therefore, the user can perform operation on of the external apparatus in the hands-free state. The convenience of the user improved.

(10) In the foot input device according to the aspect, the first operation signal, the second operation signal, and the third operation signal may be three kinds of operation signals corresponding to three kinds of operation used in the external apparatus.

With the foot input device according to this aspect, the user can perform the three kinds of operation on the external apparatus in the hands-free state. The convenience of the user is improved.

(11) In the foot input device according to the aspect, the first operation signal and the second operation signal may be signals corresponding to in-plane directions of a three-dimensional image displayed on an image display section of the external apparatus, and the third operation signal may be a signal corresponding to a depth direction of the three-dimensional image.

With the foot input device according to this aspect, the user can perform, in the hands-free state, control of the three-dimensional image displayed on the image display section of the external apparatus. The convenience of the user is improved.

(12) In the foot input device according to the aspect, the three kinds of operation signals may be signals for changing a position of a pointer in an image displayed on an image display section of the external apparatus.

With the foot input device according to this aspect, the user can change, in the hands-free state, the position of the pointer in the image displayed on the image display section of the external apparatus. The convenience of the user is improved.

(13) In the foot input device according to the aspect, external apparatus or another external apparatus connected to the external apparatus may include a moving device capable of moving in three-dimensional directions, and the three kinds of operation signals may be signals used as operation signals for moving the moving device in the three-dimensional directions.

With the foot input device according to this aspect, the user can perform, in the hands-free state, operation of the moving device capable of moving in the three-dimensional directions included in the external apparatus or the other external apparatus connected to the external apparatus. The convenience of the user is improved.

(14) According to another aspect of the invention, a head-mounted display device is provided. The head-mounted display device includes: an image display section worn on a head of a user; the foot input device according to (1); and a display setting section configured to set a display image that the display setting section causes the image display section to display. The display setting section sets, according to an operation signal output from the foot input device, a display image that the display setting section causes the image display section to display.

With the head-mounted display device according to this aspect, the user can set the display image according to the operation signal in the hands-free state. The convenience of the user is improved. Since the foot input device is the wearable device worn on the foot of the user, a fixed setting space for the pointing device of the related art can be eliminated. It is possible use the head-mounted display device in a variety of environments.

(15) In the head-mounted display device according to the aspect, when an external apparatus communicatively connected to the head-mounted display device or another external apparatus connected via the external apparatus is operated, the operation signal output from the foot input device may be delivered as the operation signal used in the external apparatus or the other external apparatus.

With the head-mounted display device according to this aspect, it is possible to operate the external apparatus communicatively connected to the head-mounted display device or the other external apparatus connected via the external apparatus. The convenience of the user is improved.

(16) In the head-mounted display device according to the aspect, the display setting section may set, according to a predetermined motion of the user, an input frame to be superimposed on the display image and set a menu around a lower frame of the input frame, the foot input device may output the operation signal for the user to select a menu desired by the user, and the display setting section may set, according to the operation signal output from the foot input device, a selection image indicating a state in which the selected menu selected.

With the head-mounted display device according to the aspect, the user can display, in the hands-free state, the menu to be superimposed on the display image and sensorily perform the selection of the menu. Operability for the user is improved.

(17) According to another aspect of the invention, a head-mounted display device is provided. The head-mounted display device includes: an image display section worn on a head of a user; a load-detection-type foot input section configured to detect a load of a sole of a foot of the user; and a display setting section configured to set, according to the load detected by the load-detection-type foot input section, a display image that the display setting section causes the image display section display.

With the head-mounted display device according to this aspect, the user can set the display image in a hands-free state. Convenience of the user is improved. Since the load-detection-type foot input section is a wearable device worn on the sole of the foot of the user, for operation, the body of the user and the head-mounted display device do not occupy a space. The head-mounted display device is used in a variety of environments.

(18) In the head-mounted display device according to the aspect, the head-mounted display device may further include a state specifying section configured to specify an activity state of the user, and the display setting section may set, when the activity state is specified as not being a moving state in which the user is moving, the display image according to the load detected by the load-detection-type foot input section and continue, when the activity state is specified as being the moving state in which the user is moving, the setting of the display image already set.

With the head-mounted display device according to this aspect, it is possible to prevent malfunction in which the display image is changed by a change in the load due to the activity state of the user and then improve convenience of the user.

(19) In the head-mounted display device according to the aspect, the load-detection-type foot input section may detect a distribution of a load in a predetermined range, and the display setting section may cause the image display section to display a pointer image set in advance and may change a display position of the pointer image on the image display section according to a change in the distribution of the load detected by the load-detection-type foot input section.

With the head-mounted display device according to this aspect, the user can sensorily change the display position of the pointer image in a hands-free manner. The convenience of the user is improved.

(20) In the head-mounted display device according to the aspect, the load-detection-type foot input section may include a right-load-detection-type foot input section configured to detect a load of a right foot; and a left-load-detection-type foot input section configured to detect a load of a left foot, and the display setting section may set the display image according to a change in the load detected by the right-load-detection-type foot input section and a change in the load detected by the left-load-detection-type foot input section.

With the head-mounted display device according to this aspect, by changing a load applied to the right foot and a load applied to the left foot, the user can sensorily variously set the display image according to a combination of the load of the right foot and the load of the left foot. The convenience of the user is improved.

(21) In the head-mounted display device according to the aspect, the load-detection-type foot input section may specify changes in positions of the right-load-detection-type foot input section and the left-load-detection-type foot input section, and the display setting section may execute enlargement or reduction of at least a portion of the display image according to the changes in the positions.

With the head-mounted display device according to this aspect, by changing a positional relation between the right foot and the left foot, the user can sensorily enlarge or reduce the display image. The convenience of the user is improved.

(22) In the head-mounted display device according to the aspect, the display setting section may cause the image display section to display a pointer image set in advance, change a position of the pointer image according to a distribution of a right load detected by the right-load-detection-type foot input section and a distribution of a left load detected by the left-load-detection-type foot input section, and differentiate a change amount of a display position of the pointer image that changes according to a change in the distribution of the right load and a change amount of a display position of the pointer image that changes according to a change in the distribution of the left load.

With the head-mounted display device according to this aspect, the user can perform fine adjustment of the display position of the pointer image with a dominant foot and perform rough adjustment of the display position of the pointer image with a foot different from the dominant foot. Consequently, the user can more finely set the display position of the pointer image by properly using the left foot and the right foot.

(23) In the head-mounted display device according to the aspect, the head-mounted display device may further include an inertial sensor formed separately from the load-detection-type foot input section and the image display section, and the display setting section may set the display image according to inertial data acquired by the inertial sensor and the load detected by the load-detection-type foot input section.

With the head-mounted display device according to this aspect, by using a load of a sole of a shoe worn by the user and a detection value acquired by the inertial sensor in another part in the user, it is possible to cause the user to efficiently perceive a movement that should be taught to the user.

(24) in the head-mounted display device according to the aspect, when the display image can be set according to the load detected by the load-detection-type foot input section, the display setting section may cause the image display section to display an image representing a position of the load-detection-type foot input section.

With the head-mounted display device according to this aspect, it is possible to cause the user to recognize the position of the load-detection-type foot input section. Operability for the user is improved.

(25) In the head-mounted display device according to the aspect, the load-detection-type foot input section may have a surface shape corresponding to the sole of the foot of the user and a sensor capable of detecting a load may be disposed in at least a part of the surface shape, and the display setting section may cause the image display section to display an image representing a position of the sensor with respect to the surface shape as to image representing the position of the load-detection-type foot input section.

With the head-mounted display device according to this aspect, it is possible to cause the user to recognize a detailed position of the sensor capable of detecting a load. The operability for the user is further improved.

The invention can also be realized in various forms other than the head-mounted display device. For example, the invention can be realized in forms of, for example, a display device, a user interface for operating various devices, a control method for the head-mounted display device and the display device, a control system, a head-mounted display system, a computer program for realizing functions of the control system and the display device, a recording medium having the computer program recorded therein, and a data signal including the computer program and embodied in a carrier wave.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figure 1:
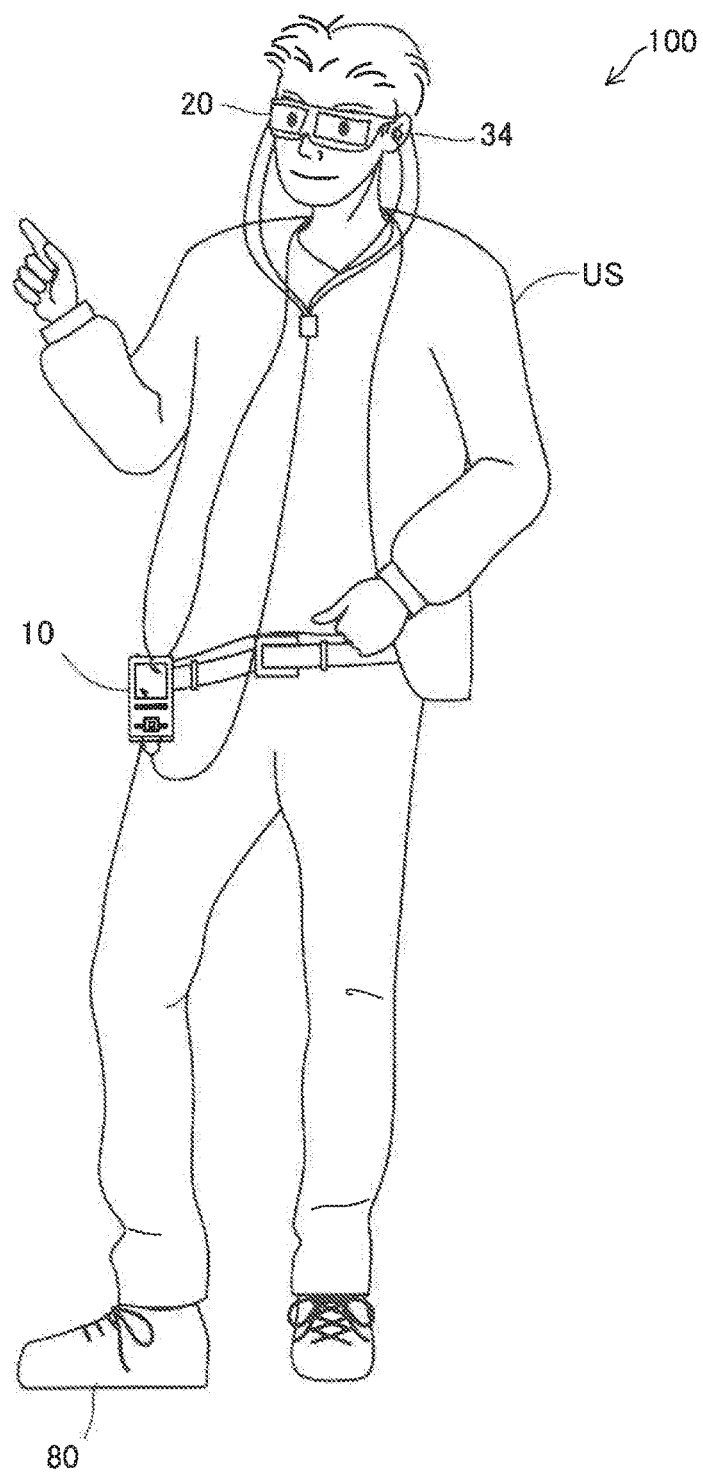
FIG. 1 is a schematic diagram of a user wearing a head-mounted display device (an HMD) in a first embodiment.

FIG. 1 is a schematic diagram of a user US wearing a head-mounted display device 100 (an HMD 100) in a first embodiment. The head-mounted display device 100 is a display device worn on a head and is called head mounted display (HMD) as well. As shown in FIG. 1, the HMD 100 includes a control section 10, an image display section 20 worn on the head of the user US, a left earphone 34, and a load-detection-type foot input section 80 disposed on a sole of a shoe worn by the user US. In the HMD 100 in the first embodiment, the user US is capable of visually recognizing an image displayed on the image display section 20 and, at the same time, capable of directly visually recognizing an outside scene transmitted through the image display section 20. Note that the HMD 100 includes components other than the components explained above. These components are explained below.

Figure 2:
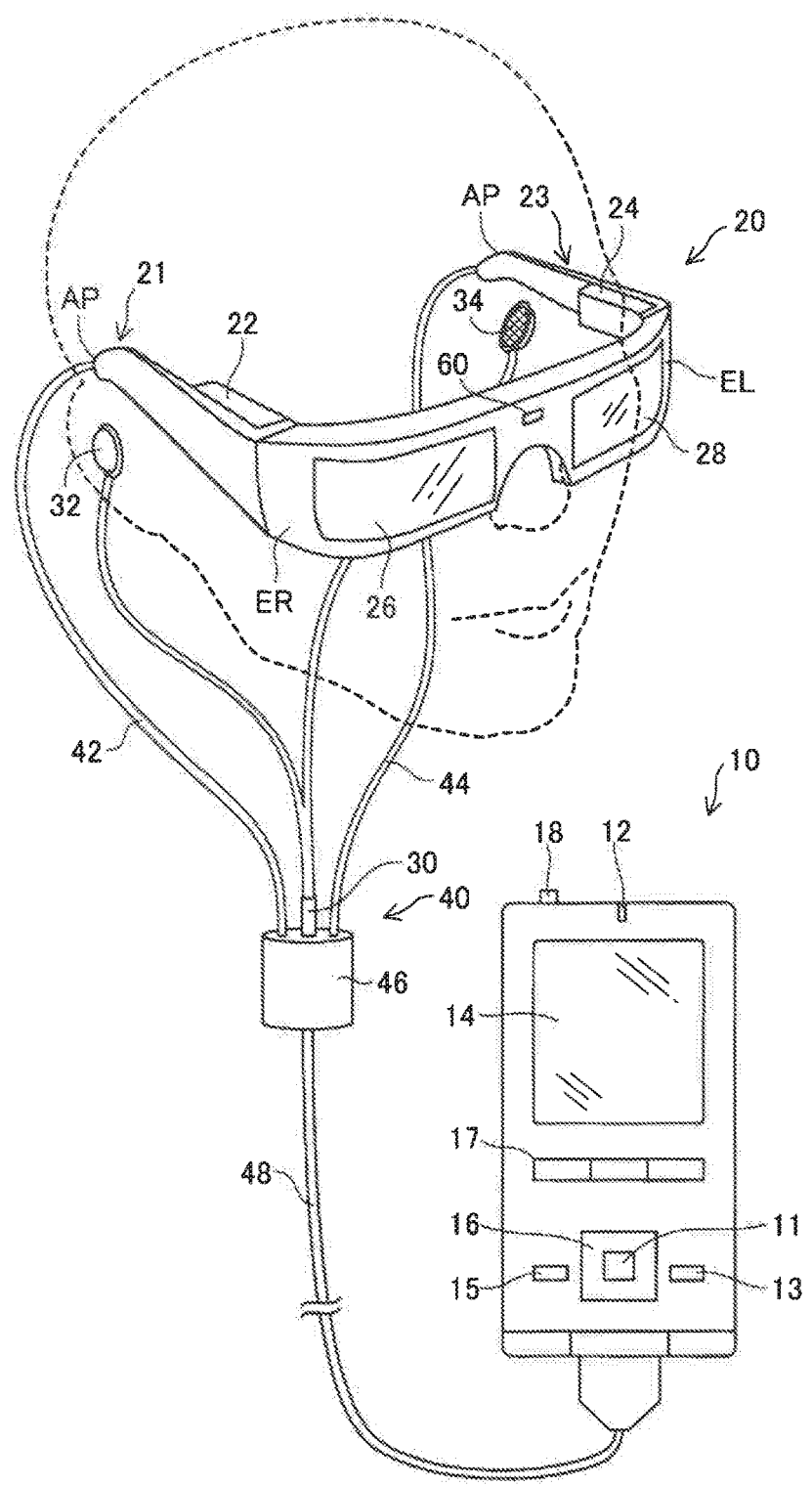
FIG. 2 is an explanatory diagram showing an exterior configuration of an image display section and a control section and peripheral devices of the image display section and the control section.

FIG. 2 is an explanatory diagram showing an exterior configuration of the image display section 20 and the control section 10 and peripheral devices of the image display section 20 and the control section 10. In FIG. 2, devices other than the load-detection-type foot input section 80 in the HMD 100 are shown. The control section 10 (a controller 10) controls the image display section 20.

The image display section 20 can display an image of contents and the like. The image display section 20 is a wearing body worn on the head of the user US. In this embodiment, the image display section 20 has an eyeglass shape. The image display section 20 includes a right holding section 21, a right display driving section 22, a left holding section 23, a left display driving section 24, a right optical-image display section 26, a left optical-image display section 28, and a camera 60. The right optical-image display section 26 and the left optical-image display section 28 are disposed to be respectively located in front of the right eye and in front of the left eye of the user US when the user US wears the image display section 20. One end of the right optical-image display section 26 and one end of the left optical-image display section 28 are connected to each other in a position corresponding to the middle of the forehead of the user US when the user US wears the image display section 20.

The right holding section 21 is a member provided to extend from an end portion ER, which is the other end of the right optical-image display section 26, to a position corresponding to the temporal region of the user US when the user US wears the image display section 20. Similarly, the left holding section 23 is a member provided to extend from an end portion EL, which is the other end of the left optical-image display section 28, to a position corresponding to the temporal region of the user US when the user US wears the image display section 20. Like temples of eyeglasses, the right holding section 21 and the left holding section 23 hold the image display section 20 on the head of the user US.

The right display driving section 22 and the left display driving section 24 are disposed on sides opposed to the head of the user US when the user US wears the image display section 20. Note that, in the following explanation, the right holding section 21 and the left holding section 23 are collectively simply referred to as "holding sections 21 and 23" as well, the right display driving section 22 and the left display driving section 24 are collectively simply referred to as "display driving sections 22 and 24" as well, and the right optical-image display section 26 and the left optical-image display section 28 are collectively simply referred to as "optical-image display sections 26 and 28" as well.

The display driving sections 22 and 24 include liquid crystal displays 241 and 242 (hereinafter referred to as "LCDs 241 and 242" as well) and projection optical systems 251 and 252 (see FIG. 3). Details of the configuration of the display driving sections 22 and 24 are explained below. The optical-image display sections 26 and 28 functioning as optical members include light guide plates 261 and 262 (see FIG. 3) and dimming plates. The light guide plates 261 and 262 are formed of a light transmissive resin material or the like and guide image lights output from the display driving sections 22 and 24 to the eyes of the user US. The dimming plates are thin plate-like optical elements and are disposed to cover the front side of the image display section 20 on the opposite side of the side of the eyes of the user US. The dimming plates protect the light guide plates 261 and 262 and suppress damage, adhesion of soil, and the like to the light guide plates 261 and 262. By adjusting the light transmittance of the dimming plates, it is possible to adjust an external light amount entering the eyes of the user US and adjust easiness of visual recognition of a display image. Note that the dimming plates can be omitted. The camera 60 picks up an image of an outside scene. The camera 60 is disposed in a position where one end of the right optical-image display section 26 and one end of the left optical-image display section 28 are connected.

The image display section 20 further includes a connecting section 40 for connecting the image display section 20 to the control section 10. The connecting section 40 includes a main body cord 48 connected to the control section 10, a right cord 42 and a left cord 44, and a coupling member 46. The right cord 42 and the left cord 44 are two cords branching from the main body cord 48. The right cord 42 is inserted into a housing of the right holding section 21 from a distal end portion AP in an extending direction of the right holding section 21 and connected to the right display driving section 22. Similarly, the left cord 44 is inserted into a housing of the left holding section 23 from a distal end portion AP in an extending direction of the left holding section 23 and connected to the left display driving section 24. The coupling member 46 is provided at a branching point of the main body cord 48 and the right and left cords 42 and 44. The coupling member 46 includes a jack for connecting an earphone plug 30. A right earphone 32 and a left earphone 34 extend from the earphone plug 30.

The image display section 20 and the control section 10 perform transmission of various signals via the connecting section 40. Connectors (not shown in the figure), which fit with each other, are respectively provided at an end of the main body cord 48 on the opposite side of the coupling member 46 and in the control section 10. The control section 10 and the image display section 20 are connected and disconnected according to fitting and unfitting of the connector of the main body cord 48 and the connector of the control section 10. For example, a metal cable or an optical fiber can be adopted as the right cord 42, the left cord 44, and the main body cord 48.

The control section 10 is a device for controlling the HMD 100. The control section 10 includes a determination key 11, a lighting section 12, a display switching key 13, a track pad 14, a luminance switching key 15, a direction key 16, a menu key 17, and a power switch 18. The determination key 11 detects pressing operation and outputs a for determining content of the operation in the control section 10. The lighting section 12 notifies, with a light emission state thereof, an operation state of the HMD 100. As the operation state of the HMD 100, there is, for example, ON/OFF of a power supply. As the lighting section 12, for example, an LED is used. The display switching key 13 detects pressing operation and outputs, for example, a signal for switching a display mode of a content moving image to 3D and 2D. The track pad 14 detects operation by a finger of the user US on an operation surface of the track pad 14 and outputs a signal corresponding to detected content. As the track pad 14, track pads of various types such as an electrostatic type, a pressure detection type, and an optical type can be adopted. The luminance switching key 15 detects pressing operation and outputs a signal for increasing or reducing the luminance of the image display section. The direction key 16 detects pressing operation on keys corresponding to the upward, downward, left, and right directions and outputs a signal corresponding to detected content. The power switch 18 detects slide operation of the switch to switch a power supply state of the HMD 100.

Figure 3:
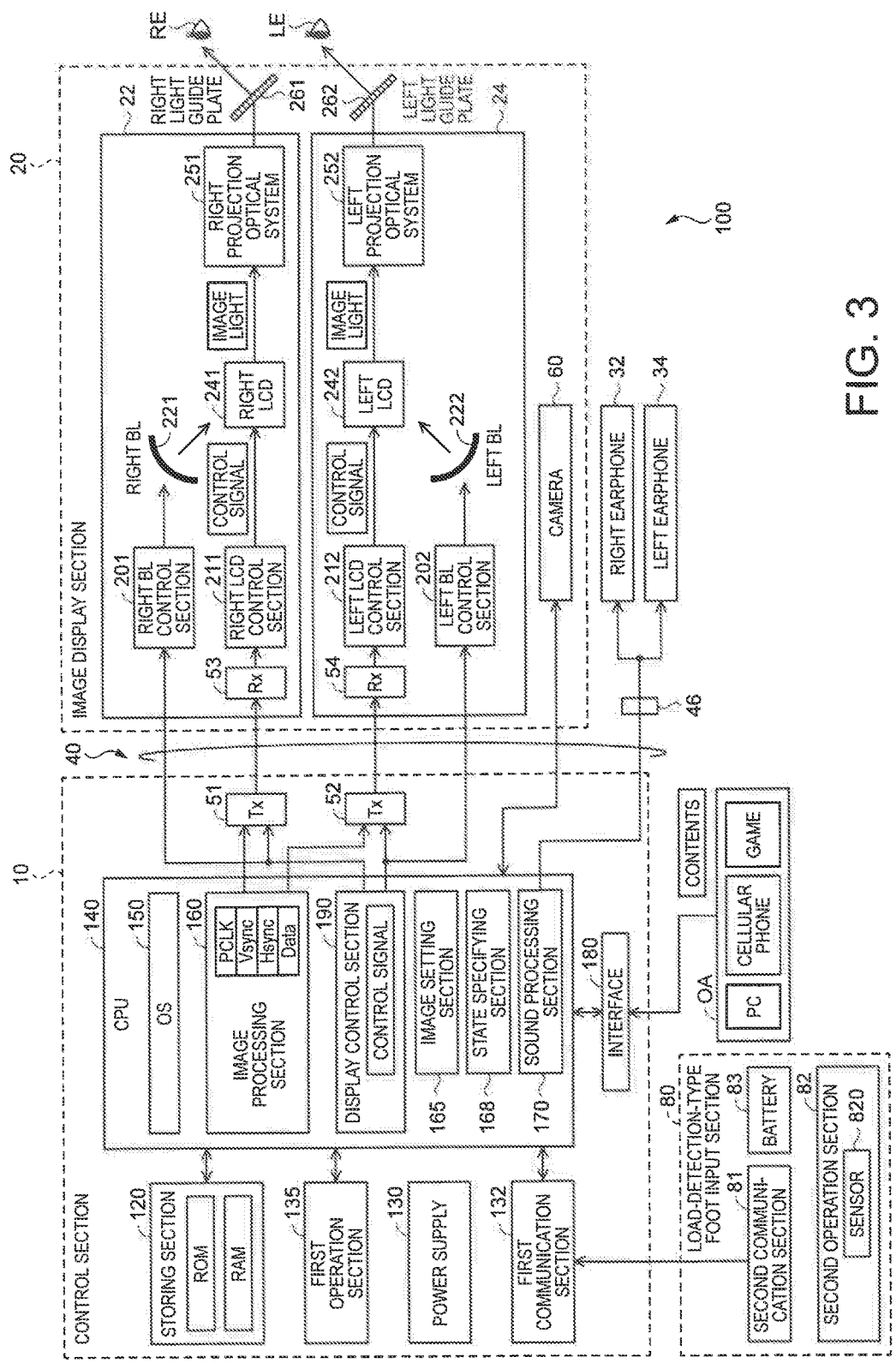
FIG. 3 is a block diagram functionally showing the configuration of the HMD in the first embodiment.

FIG. 3 is a block diagram functionally showing the configuration of the HMD 100 in the first embodiment. As shown in FIG. 3, the control section 10 includes a storing section 120, a power supply 130, a first communication section 132, a first operation section 135, a CPU 140, an interface 180, and a transmitting section 51 (Tx 51 and a transmitting section 52 (Tx 52). The first operation section 135 receives operation by the user US. The first operation section 135 is configured from the determination key 11, the display switching key 13, the track pad 14, the luminance switching key 15, the direction key 16, the menu key 17, and the power switch 18. The power supply 130 supplies electric power to the sections of the HMD 100. As the power supply 130, for example, a secondary cell can be used. The first communication section 132 performs radio communication with other apparatuses such as a contents server, a television, a personal computer, a camera, and a robot according to a predetermined wireless communication standard such as the wireless LAN or the Bluetooth. Note that, in FIG. 3, an example is shown in which wireless communication is performed with the load-detection-type foot input section 80.

The storing section 120 includes a ROM having stored therein a computer program and a RAN used by the CPU 140 in executing writing and reading of various computer programs.

The CPU 140 reads out a computer program stored in the ROM of the storing section 120 and executes writing in and reading from the RAM of the storing section 120 to thereby function as an operating system 150 (OS 150), a display control section 190, a sound processing section 170, an image processing section 160, an image setting section 165, and a state specifying section 168. The CPU 140 executes computer programs corresponding to various applications to thereby function as devices that execute the executed applications.

The display control section 190 generates control signals for controlling the right display driving section 22 and the left display driving section 24. Specifically, the display control section 190 individually controls, using the control signals, ON/OFF of driving of the right LCD 241 by a right LCD control section 211, ON/OFF of driving of a right backlight 221 by a right backlight control section 201, ON/OFF of driving of the left LCD 242 by a left LCD control section 212, ON/OFF of driving of a left backlight 222 by a left backlight control section 202, and the like. Consequently, the display control section 190 controls generation and emission of image lights respectively by the right display driving section 22 and the left display driving section 24. For example, the display control section 190 causes both of the right display driving section 22 and the left display driving section 24 to generate image lights, causes only one of the right display driving section 22 and the left display driving section 24 to generate image light, or does not cause both of the right display driving section 22 and the left display driving section 24 to generate image light.

The display control section 190 transmits control signals for the right LCD control section 211 and the left LCD control section 212 respectively via the transmitting sections 51 and 52. The display control section 190 transmits control signals respectively for the right backlight control section 201 and the left backlight control section 202.

The image processing section 160 acquires an image signal included in contents. The image processing section 160 separates synchronization signals such as a vertical synchronization signal VSync and a horizontal synchronization signal HSync from the acquired image signal. The image processing section 160 generates a clock signal PCLK using a PLL (Phase Locked Loop) circuit or the like (not shown in the figure) according to cycles of the separated vertical synchronization signal VSync and horizontal synchronization signal HSync. The image processing section 160 converts an analog image signal, from which the synchronization signals are separated, into a digital image signal using an A/D conversion circuit or the like (not shown in the figure). Thereafter, the image processing section 160 stores the digital image signal after the conversion in a DRAM in the storing section 120 frame by frame as image data (RGB data) of a target image. Note that the image processing section 160 may execute, on the image data, image processing such as resolution conversion processing, various kinds of tone correction processing such as adjustment of luminance and chroma, and keystone correction processing according to necessity.

The image processing section 160 transmits the clock signal PCLK, the vertical synchronization signal VSync, and the horizontal synchronization signal HSync generated by the image processing section 160 and the image data stored in the DRAM in the storing section 120 respectively via the transmitting sections 51 and 52. Note that the image data transmitted via the transmitting section 51 is referred to as "image data for right eye" as well. The image data transmitted via the transmitting section 52 is referred to as "image data for left eye" as well. The transmitting sections 51 and 52 function as a transceiver for serial transmission between the control section 10 and the image display section 20.

The sound processing section 170 acquires a sound signal included in the contents, amplifies the acquired sound signal, and supplies the amplified sound signal to a speaker (not shown in the figure) in the right earphone 32 and a speaker (not shown in the figure) in the left earphone 34 connected to the coupling member 46. Note that, for example, when a Dolby (registered trademark) system is adopted, processing for the sound signal is performed. Different sounds, the frequencies or the like of which are varied, are respectively output from the right earphone 32 and the left earphone 34.

The state specifying section 168 specifies an activity state of the user US of the HMD 100 on the basis of a control signal transmitted from the load-detection-type foot input section 80. Specifically, the state specifying section 168 specifies the activity state of the user US on the basis of a change in a load of the user US detected by the load-detection-type foot input section 80. For example, when the load of the user US detected by the load-detection-type foot input section 80 increases or decreases at a constant cycle, the state specifying section 168 specifies that the activity state is a moving state in which the user US is walking. As another example of the activity state, when the load of the user US detected by the load-detection-type foot input section 80 is constant and does not change, the state specifying section 168 specifies the activity state as a state in which the user US is sitting or a state in which the user US is standing without moving.

The image setting section 165 performs various kinds of setting of an image that the image setting section 165 causes the image display section 20 to display (a display image). For example, the image setting section 165 sets a display position of the display image, the size of the display image, the luminance of the display image, and the like and sets image data for right eye and image data for left eye to form a binocular parallax (simply referred to as "parallax" as well) in order to cause the user US to three-dimensionally (3D) recognize the display image as a three-dimensional image. As explained in detail below, when the state specifying section 168 specifies that the activity state of the user US is not the moving state, the image setting section 165 sets, according to the change in the load detected by the load-detection-type foot input section 80, a display image that the image setting section 165 causes the optical-image display sections 26 and 28 to display. In other words, when the state specifying section 168 specifies that the activity state of the user US is the moving state, irrespective of the change in the load detected by the load-detection-type foot input section 80, the image setting section 165 maintains a display image already set and displayed on the optical-image display sections 26 and 28. Note that the image setting section 16 is equivalent to the "display setting section" in the appended claims.

The interface 180 is an interface for connecting various external apparatuses OA, which function as supply sources of contents, to the control section 10. Examples of the external apparatuses OA include various apparatuses such as a personal computer (PC), a cellular phone terminal, a game terminal, a video reproducing apparatus, a camera, and a robot. As the interface 180, for example, among various interfaces such as a USB interface, a micro USB interface, an interface for a memory card, an interface for a monitor, and an interface for a network, a plurality of interfaces can be used.

The image display section 20 includes the right display driving section 22, the left display driving section 24, the right light guide plate 261 functioning as the right optical-image display section 26, the left light guide plate 262 functioning as the left optical-image display section 28, and the camera 60.

The right display driving section 22 includes a receiving section 53 (Rx 53), the right backlight control section 201 (right BL control section 201) and the right backlight 221 (right BL 221) functioning as a light source, the right LCD control section 211 and the right LCD 241 functioning as a display element, and the right projection optical system 251. The right backlight control section 201 and the right backlight 221 function as the light source. The right LCD control section 211 and the right. LCD 241 function as the display element. Note that the right backlight control section 201, the right LCD control section 211, the right backlight 221, and the right LCD 241 are collectively referred to as "image-light generating section" as well.

The receiving section 53 functions as a receiver for serial transmission between the control section 10 and the image display section 20. The right backlight control section 201 drives the right backlight 221 on the basis of an input control signal. The right backlight 221 is, for example, a light emitting body such as an LED or an electroluminescence (EL) element. The right LCD control section 211 drives the right LCD 241 on the basis of the clock signal PCLK, the vertical synchronization signal VSync, the horizontal synchronization signal HSync, and the image data for right eye input via the receiving section 53. The right LCD 241 is a transmissive liquid crystal panel on which a plurality of pixels are arranged in a matrix shape.

The right projection optical system 251 is configured by a collimate lens that changes the image light emitted from the right LCD 241 to light beams in a parallel state. The right light guide plate 261 functioning as the right optical-image display section 26 guides the image light output from the right projection optical system 251 to a right eye RE of the user US while reflecting the image light along a predetermined optical path. Note that the right projection optical system 251 and the right light guide plate 261 are collectively referred to as "light guide section" as well.

The left display driving section 24 includes a configuration same as the configuration of the right display driving section 22. The left display driving section 24 includes a receiving section 54 (Rx 54), the left backlight control section 202 (left BL control section 202) and the left backlight 222 (left BL 222) functioning as a light source, the left LCD control section 212 and the left LCD 242 functioning as a display element, and the left projection optical system 252. The left backlight control section 202 and the left backlight 222 function as the light source. The left LCD control section 212 and the left LCD 242 function as the display element. Note that the left backlight control section 202, the left LCD control section 212, the left backlight 222, and the left LCD 242 are collectively referred to as "image-light generating section" as well. The left projection optical system 252 is configured by a collimate lens that changes image light emitted from the left LCD 242 to light beams in a parallel state. The left guide plate 262 functioning as the left optical-image display section 28 guides the image light output from the left projection optical system 252 to a left eye LE of the user US while reflecting the image light along a predetermined optical path. Note that the left projection optical system 252 and the left light guide plate 262 are collectively referred to as "light guide section" as well.

Figure 4:
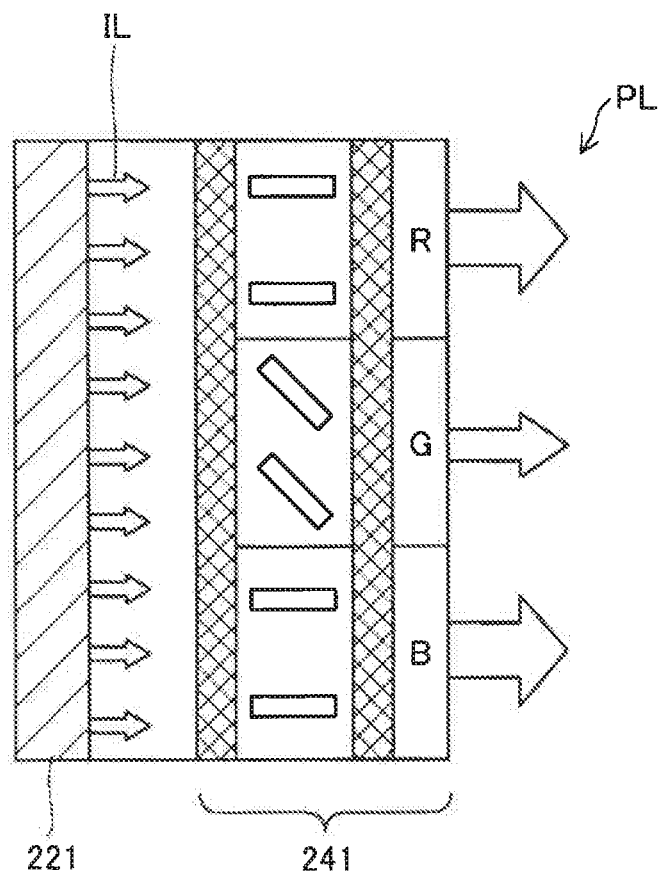
FIG. 4 is an explanatory diagram showing a state in which image light is emitted by an image-light generating section.

FIG. 4 is an explanatory diagram showing a state in which image light is emitted by the image-light generating section. The right LCD 241 changes, by driving liquid crystal in pixel positions arranged in a matrix shape, the transmittance of light transmitted through the right LCD 241 to thereby modulate illumination light IL radiated from the right backlight 221 into effective image light PL representing an image. The same holds true concerning the left side. Note that, as shown it FIG. 3, a backlight system is adopted in the first embodiment. However, image light may be emitted using a front light system (also called "reflection system" as well).

The load-detection-type foot input section 80 (FIG. 3) detects a distribution in a predetermined range of a load applied to a sole of a shoe from a sole of a foot according to a movement of the user US and outputs an operation signal corresponding to the detected distribution of the load. The load-detection-type foot input section 80 includes a second communication section 81, a second operation section 82, and a battery 83. The battery 83 supplies electric power to the second communication section 81 and the second operation section 82. As the battery 83, for example, a secondary battery can be used. The second communication section 81 transmits a control signal (an operation signal) output by the second operation section 82 to the first communication section 132. The second communication section 81 performs wireless communication with the first communication section 132 according to a predetermined wireless communication standard such as the wireless LAN or the Bluetooth. The second operation section 82 includes a sensor 820 disposed in the sole of the shoe. The sensor 820 is a load sensor that detects the distribution in the predetermined range of the load applied to the sole of the shoe from the sole of the foot. Note that the load-detection-type foot input section 80 is equivalent to the "foot input device" in the appended claims.

Figure 5:
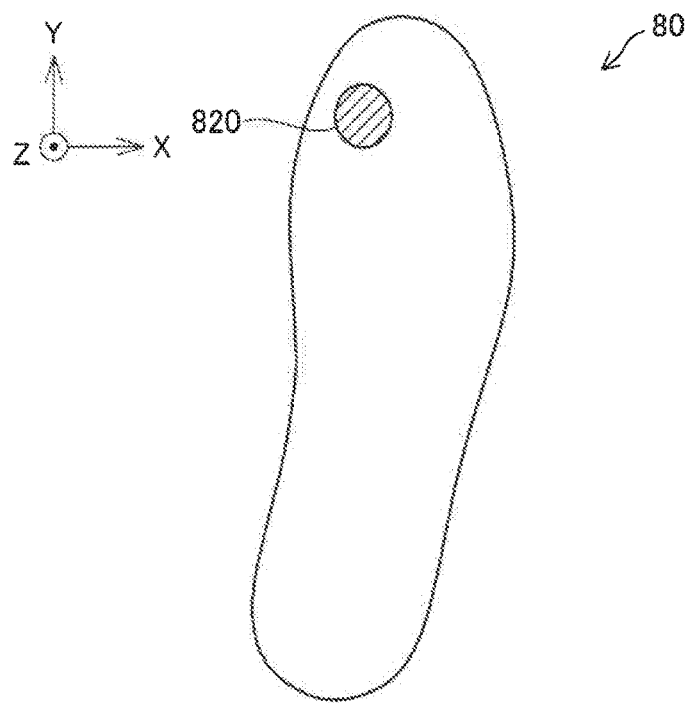
FIG. 5 is an explanatory diagram showing the position of a sensor disposed in a sole of a shoe.

FIG. 5 is an explanatory diagram showing the position of the sensor 820 disposed in the sole of the shoe. As shown in FIG. 5, the sensor 820 is disposed near a toe of a sole of a right shoe worn on the right foot of the user US functioning as the load-detection-type foot input section 80. The sensor 820 is disposed in a position corresponding to the vicinity of the position of the big toe of the right foot of the user US when the user US wears the right shoe. Note that, in FIG. 5, an X axis, a Y axis, and a Z axis orthogonal to one another are shown in order to represent a relation between positions and directions in FIGS. 6 and 7 referred to below. The X axis is an axis parallel to the left-right direction in FIG. 5. The Y axis is an axis parallel to the up-down direction in FIG. 5. The Z axis is an axis orthogonal to the surface of the sole of the shoe.

Figure 6:
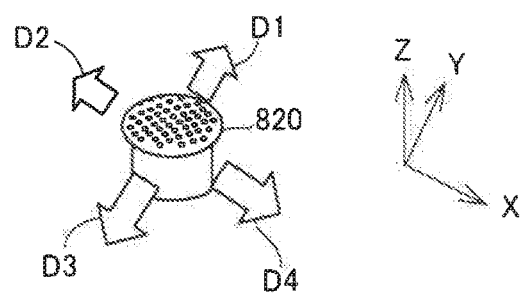
FIG. 6 is an image diagram of control signals output by a second operation section according to changes in a distribution of a load received by the sensor.
Figure 7:
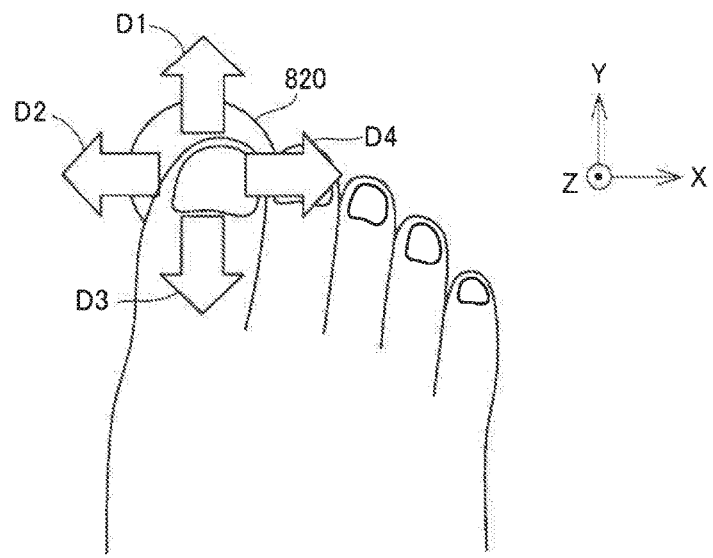
FIG. 7 is an image diagram of the control signals output by the second operation section according to the changes in the load received by the sensor.

FIGS. 6 and 7 are image diagrams of control signals output by the second operation section 82 according to a change in a distribution of a load received by the sensor 820. As shown in FIGS. 6 and 7, when the sensor 820 detects a change in the distribution of the load in a load direction D1 extending along the positive direction of the Y axis, the second operation section 82 outputs a control signal along the positive direction of the Y axis. In this case, for example, the image setting section 165 changes, according to the control signal output by the second operation section 82, a display position of, for example, an image of a pointer displayed on the optical-image display sections 26 and 28. The second operation section 82 outputs control signals in directions extending along detected load directions D2, D3, and D4. Note that, when the state specifying section 168 determines that the activity state of the user US is not the moving state, the image setting section 165 in this embodiment effectively treats the control signal transmitted from the load-detection-type foot input section 80 as being enabled. In other words, when the state specifying section 168 determines that the activity state of the user US is the moving state, the image setting section 165 treats the control signal transmitted from the load-detection-type foot input section 80 as being disabled.

Figure 8:
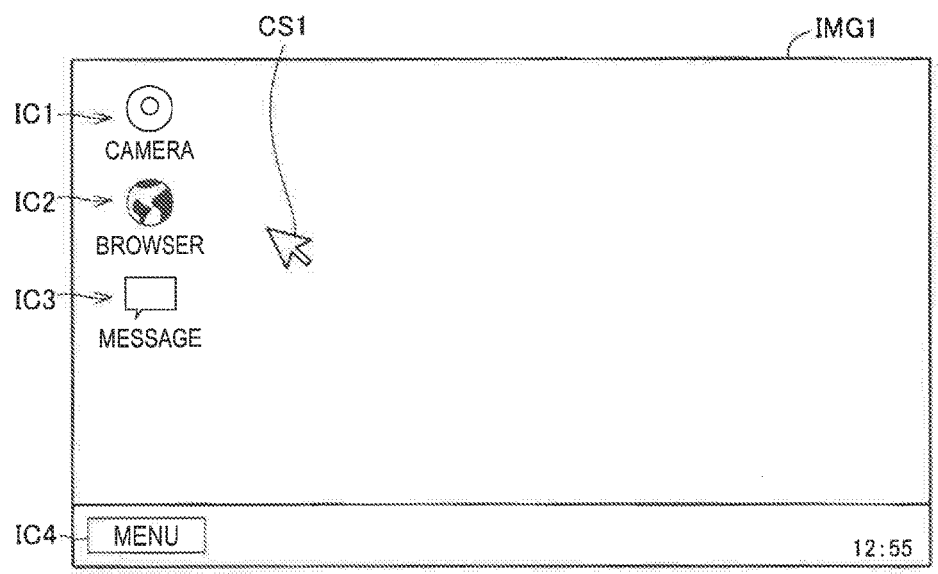
FIG. 8 is an explanatory diagram of an arrow image, a display position of which is changed according to a control signal detected by the second operation section.
Figure 9:
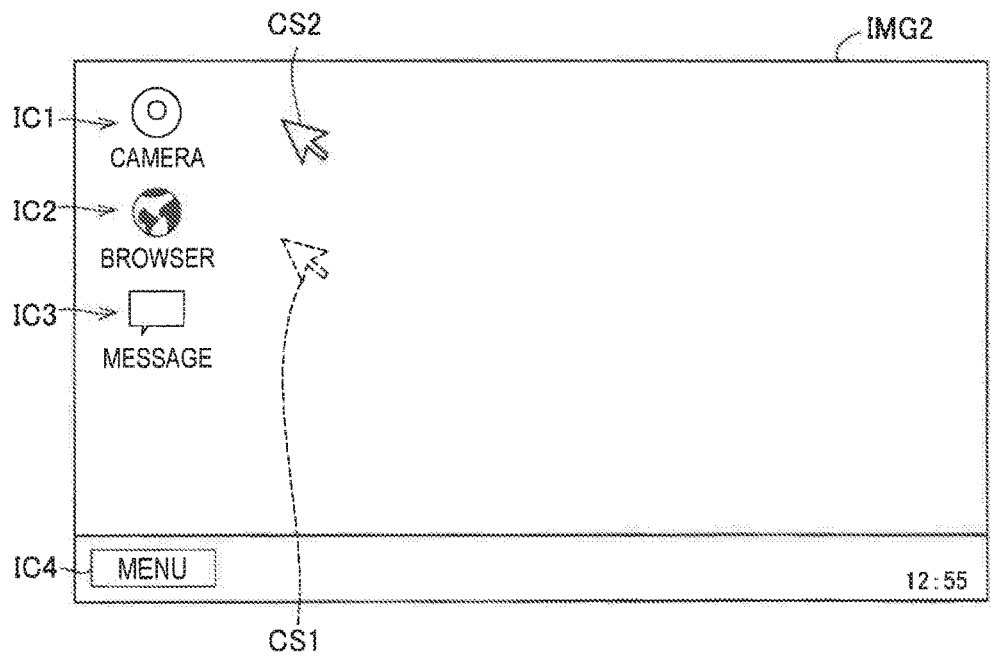
FIG. 9 is an explanatory diagram of the arrow image, the display position of which is changed according to the control signal detected by the second operation section.

FIGS. 8 and 9 are explanatory diagrams of an arrow image CS1, a display position of which is changed according to a control signal detected by the second operation section 82. In FIG. 8, a display image IMG1 displayed on the optical-image display sections 26 and 28 before being adapted to a change in a distribution of a load detected by the second operation section 82 is shown. In FIG. 9, a display image IMG2 displayed on the optical-image display sections 26 and 28 after being adapted to the change in the distribution of the load detected by the second operation section 82 is shown. The display image IMG1 includes four icon images IC1, IC2, IC3, and IC4 and the arrow image CS1. The icon image IC1 is a selection image for, when being selected, executing image pickup of an outside scene by the camera 60. The icon image IC2 is a selection image, when being selected, connected to the Internet to display various Web pages as images. The icon image IC3 is a selection image for, when being selected, executing exchange of a message with other devices via the first communication section 132. The icon image IC4 is a selection image for, when being selected, opening a menu screen for executing operation such as an end of the display of the display image IMG1. The arrow image CS1 is an image for changing a display position in the display image IMG1 according to the change in the load detected by the second operation section 82. When determination operation is performed in a state in which the arrow image CS1 overlaps an icon image, a computer program corresponding to the overlapping icon image is executed. Examples of the determination operation include operation such as pressing of the determination key 11 of the first operation section 135.

In FIG. 9, in comparison with FIG. 8, a display image IMG2 in which the position of the arrow image CS1 changes to an arrow image CS2 is shown. Note that, in FIG. 9, the position of the arrow image CS1 in the display image IMG1 not actually displayed is indicated by a broken line. The arrow image CS2 is an image after the second operation section 82 detects a change in a distribution of a load along the load direction D1 (FIGS. 6 and 7) from the state of the arrow image CS1. The image setting section 165 changes, according to the change in the distribution of the load detected by the second operation section 82, the display position of the arrow image CS1 included in the display image IMG1. In other words, the user US can freely change the display position of the arrow image CS1 in the display image IMG1 by changing, with the big toe of the right foot, a distribution of a load applied to the sole of the shoe by the big toe. Note that the arrow images CS1 and CS2 are equivalent to the "pointer image" in the appended claims.

As explained above, in the HMD 100 in the first embodiment, the image setting section 165 sets, according to the load of the user US detected by the second operation section 82 of the load-detection-type foot input section 80, the display image that the image setting section 165 causes the optical-image display section 26 and 28 to display. Therefore, in the HMD 100 in this embodiment, the user US can execute, for example, movement of the pointer image serving as the display image in a hands-free state. Convenience of the user US is improved. The load-detection-type foot input section 80 is a wearable device disposed in a sole of a footwear worn by the user US. Therefore, for operation, the HMD 100 does not occupy a space more than necessary. The HMD 100 is used in various environments.

In the HMD 100 in the first embodiment, the state specifying section 168 specifies according to the load detected by the load-detection-type foot input section 80 whether the activity state of the user US is the moving state. Only when the activity state of the user US is not the moving state, the image setting section 165 sets a display image according to the load detected by the load-detection-type foot input section 80. Therefore, in the HMD 100 in the first embodiment, it is possible to prevent malfunction in which the display image is changed by a change in the load due to the moving state of the user US and then improve the convenience of the user US.

In the HMD 100 in this embodiment, the image setting section 165 changes, according to a change in the distribution of the load detected by the load-detection-type foot input section 80, the display positions of the arrow images CS1 and CS2 that the image setting section 165 causes the optical-image display sections 26 and 28 to display. Therefore, in the HMD 100 in this embodiment, the user US can sensorily change the display positions of the arrow images CS1 and CS2 in a hands-free manner. The convenience of the user US is improved.

B. Second Embodiment

Figure 10:
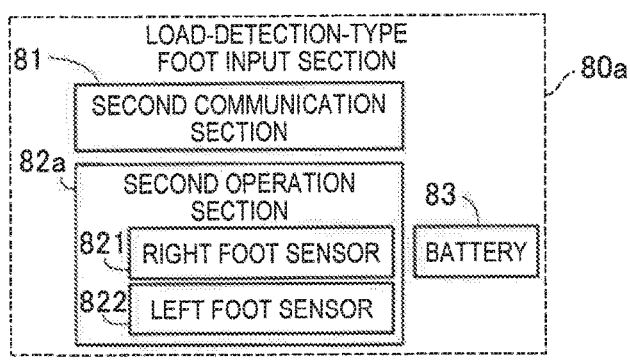
FIG. 10 is a block diagram of a load-detection-type foot input section in a second embodiment.

FIG. 10 is a block diagram of a load-detection-type foot input section 80*a* in a second embodiment. In an HMD in the second embodiment, compared with the HMD 100 (FIGS. 1 to 3) in the first embodiment, the load-detection-type foot input section 80*a* is different. The other components are the same as the components of the HMD 100 in the first embodiment. Therefore, in the second embodiment, details of the load-detection-type foot input section 80*a* different from the load-detection-type foot input section 80 in the first embodiment are explained. Concerning the components same as the components in the first embodiment, illustration and explanation are omitted.

As shown in FIG. 10, the load-detection-type foot input section 80*a* in the second embodiment includes a right foot sensor 821 and a left foot sensor 822. The right foot sensor 821 is a load sensor disposed in a sole of a right shoe worn on the right foot of the user US. The left foot sensor 822 is a load sensor disposed in a sole of a left shoe worn on the left foot of the user US. The right foot sensor 821 and the left foot sensor 822 also function as an acceleration sensor that can detect acceleration of the foot cat the user US on which the acceleration sensor is worn. Note that the right foot sensor 821 is equivalent to the "right-load-detection-type foot input section" and the "right-foot-load detecting section" in the appended claims. The left foot sensor 822 is equivalent to the "left-load-detection-type foot input section" and the "left-foot-load detecting section" in the appended claims.

Figure 11:
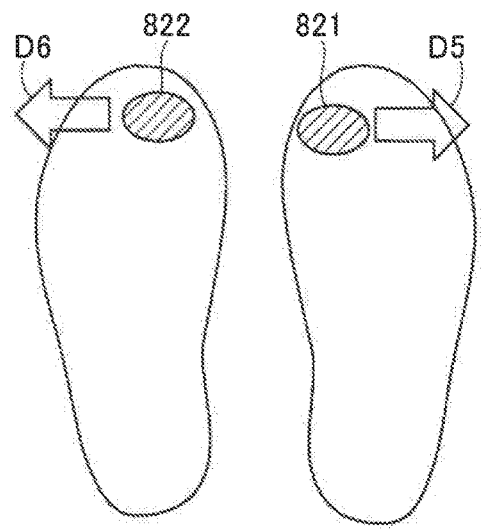
FIG. 11 is a schematic diagram of a right foot sensor and a left foot sensor.

FIG. 11 is a schematic diagram of the right foot sensor 821 and the left foot sensor 822. Like the second communication section 81 in the first embodiment, the right foot sensor 821 is disposed in a position corresponding to a position under the big toe of the right foot when the user US wears a shoe on the right foot. The left foot sensor 822 is disposed in a position corresponding to a position under the big toe of the left foot when the user US wears a shoe on the left foot. When the right foot sensor 821 detects acceleration along a load direction D5 and the left foot sensor 822 detects acceleration along a load direction D6 opposite to the load direction D5, the image setting section 165 enlarges an image in a predetermined range centering on the display position of the arrow image CS1. To put is simply, when the right foot sensor 821 and the left foot sensor 822 detect a change in positions of the right foot and the left foot of the user US separating from each other, the image setting section 165 enlarges the display image in the predetermined range.

Figure 12:
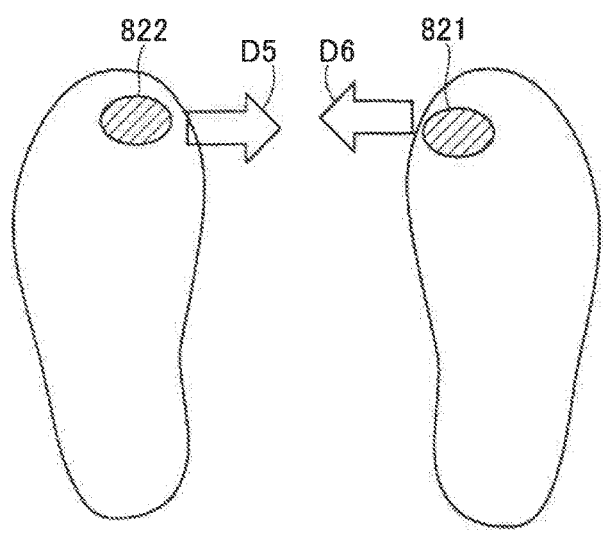
FIG. 12 is a schematic diagram of the right foot sensor and the left foot sensor.

FIG. 12 is a schematic diagram of the right foot sensor 821 and the left foot sensor 822. As shown in FIG. 12, when the right foot sensor 821 detects acceleration along the load direction D6 and the left foot sensor 822 detects acceleration along the load direction D5, the image setting section 165 reduces the image in the predetermined range centering on the display position of the arrow image CS1. To put it simply, when the right foot sensor 821 and the left foot sensor 822 detect a change in the positions of the right foot and the left foot of the user US approaching each other, the image setting section 165 reduces the display image in the predetermined range.

As explained above, in an HMD 100a in the second embodiment, the second operation section 82 includes the right foot sensor 821 that detects acceleration serving as a change in the position of the right foot of the user US and the left foot sensor 822 that detects acceleration serving as a change in the position of the left foot of the user US. The image setting section 165 sets a display image of the optical-image display sections 26 and 28 according to the changes in the positions of the right foot of the user US on which the right foot sensor 821 is worn and the left foot of the user US on which the left foot sensor 822 is worn. Further, the image setting section 165 executes enlargement or reduction of the display image according to the changes in the positions of the right foot of the user US on which the right foot sensor 821 worn and the left foot of the user US on which the left foot sensor 822 is worn. Therefore, in the HMD 100a in the second embodiment, the user US can sensorily operate the display image by changing a positional relation between the right foot and the left foot. Convenience of the user US is improved.

C. Third Embodiment

In a third embodiment, as in the second embodiment, a second operation section 82a includes the right foot sensor 821 and the left foot sensor 822 (FIG. 10). Compared with the second embodiment, control executed by the image setting section (FIG. 3) is different. In the third embodiment, an image setting section 165b changes the display positions (FIGS. 8 and 9) of the arrow images CS1 and CS2 according to a change in a distribution of a load detected by the right foot sensor 821 and a change in a distribution of a load detected by the left foot sensor 822. In the third embodiment, the image setting section controls a change amount of the display position of the arrow image CS1 corresponding to a change amount of the load detected by the right foot sensor 821 and a change amount of the display position of the arrow image CS1 corresponding to a change amount of the load detected by the left foot sensor 822 to be different. Specifically, in the third embodiment, the change amount of the display position of the arrow image CS1 corresponding to the change amount of the distribution of the load detected by the right foot sensor 821 is smaller than the change amount of the display position of the arrow image CS1 corresponding to the change amount of the distribution of the load detected by the left foot sensor 822.

As explained above, in the HMD in the third embodiment, the change amount of the display position of the arrow image CS1 corresponding to the change in the distribution of the load detected by the right foot sensor 821 and the change amount of the display position of the arrow image CS1 corresponding to the change in the distribution of the load detected by the left foot sensor 822 are different. Therefore, in the HMD in the third embodiment, the user US can perform fine adjustment of the display position of the arrow image CS1 with a dominant foot and perform rough adjustment of the display position of the arrow image CS1 with a foot different from the dominant foot. Consequently, the user US can more finely set the display position of the arrow image CS1 by properly using the left foot and the right foot.

D. Fourth Embodiment

Figure 13:
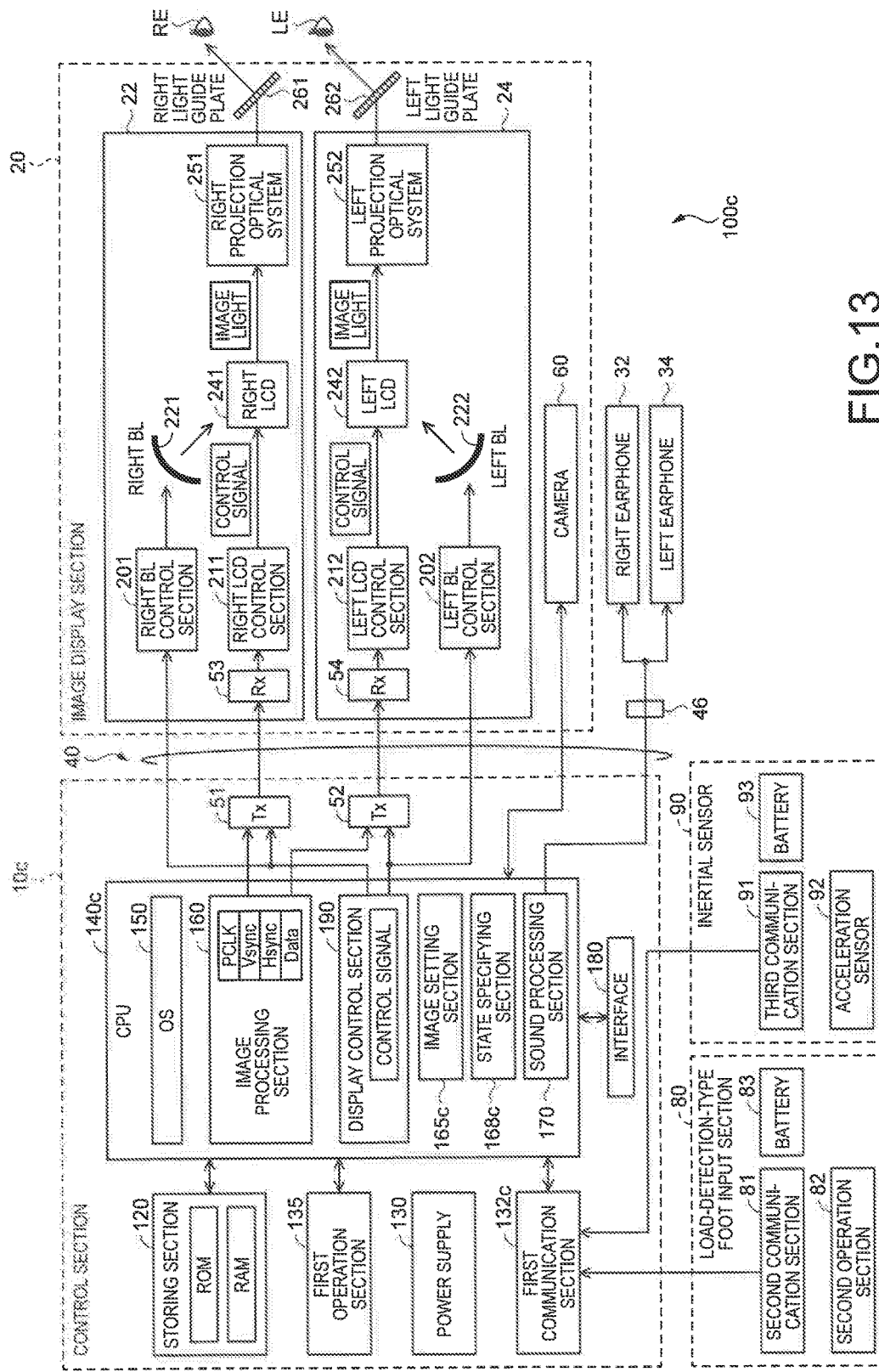
FIG. 13 is a block diagram functionally showing the configuration of an HMD in a fourth embodiment.

FIG. 13 is a block diagram functionally showing the configuration of an HMD 100c in a fourth embodiment. The HMD 100c in the fourth embodiment is different from the HMD 100 (FIG. 3) in the first embodiment in that the HMD 100c includes an inertial sensor 90 worn on a position other than the head of the user US and a sole of a shoe worn by the user US and in that an image setting section 165c sets a display image on the basis of a detection value of inertial sensor 90 and a detection value of a load-detection-type foot input section 80c. The other components are the same as the components of the HMD 100 in the first embodiment. Note that, in FIG. 13, a block diagram of contents connected to the interface 180 shown in FIG. 3 is omitted and not shown.

As shown in FIG. 13, the HMD 100c in the fourth embodiment includes the inertial sensor 90. The inertial sensor 90 is worn on a knee of the user US and detects a motion of the user US. The inertial sensor 90 includes a third communication section 91, an acceleration sensor 92, and a battery 93. The battery 93 supplies electric power to the third communication section 91 and the acceleration sensor 92. As the battery 93, for example, a secondary battery can be used. The third communication section 91 transmits a control signal output by the acceleration sensor 92 to a first communication section 132c. The acceleration sensor 92 detects acceleration on the basis of the gravity direction. Therefore, the inertial sensor 90 specifies a motion of the user US on the basis of the acceleration detected by the acceleration sensor 92. Note that the acceleration detected by the acceleration sensor 92 is equivalent to the "inertial data" in the appended claims.

Only in a state in which the inertial sensor 90 hardly detects a change in a motion (e.g., a state in which the user US stands still), the image setting section 165c enables a load detected by the load-detection-type foot input section 80 and changes a display position of the arrow image CS1. The image setting section 165c can display, according to operation received by the first operation section 135, a detection value of the inertial sensor 90 and a detection value of the load-detect n-type foot input section 80 on the optical-image display sections 26 and 28 as numerical values or graphs.

A state specifying section 168c in the fourth embodiment can specify an activity state of the user US on the basis of the acceleration detected by the inertial sensor 90 and a change in a distribution of the load detected by the load-detection-type foot input section 80. The state specifying section 168c can specify that the user US in a moving state by detecting that a change in the acceleration detected by the inertial sensor 90 fluctuates at a fixed cycle with respect to the gravity direction and the user US is moving along a surface parallel to the gravity direction.

As explained above, in the HMD 100c in the fourth embodiment, the image setting section 165c sets the display image according to the detection value detected by the inertial sensor 90 worn on the portion different from the head of the user US and the shoe worn by the user US. Therefore, in the HMD 100*c* in the fourth embodiment, control by a combination of the detection value of the load-detection-type foot input section 80 and the detection value of the inertial sensor 90 is possible. Therefore, it is possible to execute various kinds of control. In the HMD 100*c* in the fourth embodiment, by using a load of a sole of a shoe worn by the user US and detection values of other parts in the user US, for example, it is possible to apply the HMD 100*c* in order to sense an ideal movement of the body of the user US in a dance or the like. Examples of the movement of the body of the user US include a swing of golf and the balance of the left and right feet in skiing.

E. Fifth Embodiment

Figure 14:
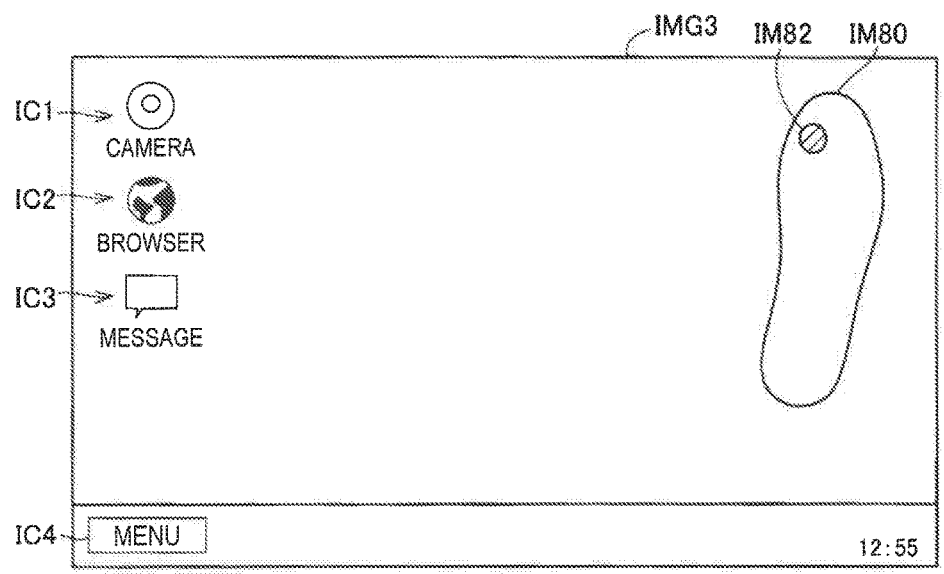
FIG. 14 is an explanatory diagram of an input section image representing the position of a second operation section with respect to a load-detection-type foot input section displayed on only a right optical-image display section.

FIG. 14 is an explanatory diagram of an input section image IM80 representing the position of the second operation section 82 with respect to the load-detection-type foot input section 80 displayed on only the right optical-image display section 26. In an HMD according to the fifth embodiment, compared with the first embodiment, processing in which the image setting section 165 (FIG. 3) causes only the right optical-image display section 26 to display the input section image IM80 is different. The other kinds of processing and the other components are the same as the processing and the components of the HMD 100 in the first embodiment. Therefore, in the fifth embodiment, the input section image IM80 is explained. Explanation concerning the processing and the components same as the processing and the components in the first embodiment is omitted.

As shown in FIG. 14, the image setting section 165 causes the right optical-image display section 26 to display a display image IMG3. In the upper right of the display image IMG3, the input section image IM80 representing the position of the second operation section 82 (specifically, the sensor 820) capable of detecting a load of the user US in the load-detection-type foot input section 80 shown in FIG. 5 is included. Note that, in the fifth embodiment, the image setting section 165 causes the left optical-image display section 28 to display the display image IMG3 not including the put section image IM80. In other embodiments, the image setting section 165 may cause the left optical-image display section 28 to display the same display image IMG3 that the image setting section 165 causes the right optical-image display section 26 to display.

The input section image IM80 is an image having a surface shape corresponding to the sole of the right foot of the user US. The input section image IM80 includes an operation position image IM82. The position of the operation position image IM82 in the input section image IM80 is the same as the position of the second operation section 82 (the sensor 820) in the load-detection-type foot input section 80. In other words, the input section image IM80 is an image for causing the user US to recognize in which portion the operation position image IM82 is located in the input section image IM80.

As explained above, in the HMD in the fifth embodiment, the image setting section 165 causes the right optical-image display section 26 to display the input section image IM80 including the operation position image IM82. The input section image IM80 is an image representing the position of the second operation section 82 with respect to the load-detection-type foot input section 80. Therefore, in the HMD in the fifth embodiment, the user US can recognize, by visually recognizing the input section image IM80, the position of the second operation section 82 to which a load is applied in order to execute operation. Consequently, operability for the user US is improved. Further, the input section image IM80 representing the load-detection-type foot input section 80 worn on the right foot of the user US is displayed on only the right optical-image display section 26 corresponding to the right eye RE of the user US. The input section image IM80 is included in the right side in the display image IMG3. Therefore, the user US can more sensorily recognize that the load-detection-type foot input section 80 corresponds to the right foot. The operability for the user US is further improved.

Sixth Embodiment

Figure 15:
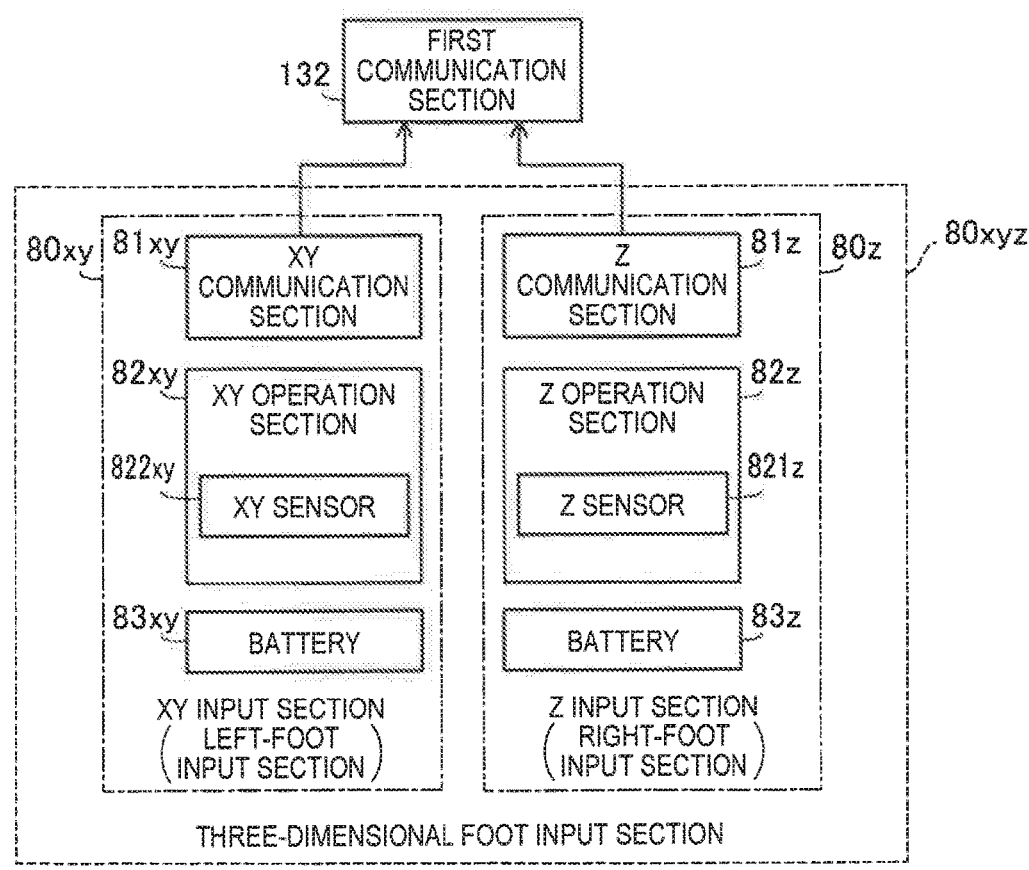
FIG. 15 is a block diagram of a three-dimensional foot input section in a sixth embodiment.

FIG. 15 is a block diagram of a three-dimensional foot input section 80*xyz* in a sixth embodiment. In an HMD in the sixth embodiment, compared with the HMD 100 (FIGS. 1 to 3) in the first embodiment, the three-dimensional foot input section 80*xyz* worn on a foot of the user US is different. The other components are the same as the components of the HMD 100 in the first embodiment. Therefore, in the sixth embodiment, details of the three-dimensional foot input section 80*xyz* different from the load-detection-type foot input section 80 in the first embodiment are explained. Concerning the components same as the components in the first embodiment, illustration and explanation are omitted.

The three-dimensional foot input section 80*xyz* includes an XY input section 80*xy*, which is a left-foot input section worn on a left foot by being disposed in a sole of a left shoe of the user US, and a Z input section 80*z*, which is a right-foot input section worn on a right foot by being disposed in a sole of aright shoe of the user US. The XY input section 80*xy* includes an XY communication section 81*xy*, an XY operation section 82*xy*, and a battery 83*xy*. The Z input section 80*z* includes a Z communication section 81*z*, a Z operation section 82*z*, and a battery 83*z*. The battery 83*xy* supplies electric power to the XY communication section 81*xy* and the XY operation section 82*xy*. The battery 83*z* supplies electric power to the Z communication section 81*z* and the Z operation section 82*z*. The XY communication section 81*xy* transmits a control signal in an X direction (an X control signal, an X operation signal) and a control signal in a Y direction (a Y control signal, a Y operation signal) output by the XY operation section 82*xy* to the first communication section 132 through wireless communication same as the wireless communication in the second communication section 81 (FIG. 3). The Z communication section 81*z* transmits a control signal in a Z direction (a Z control signal, a Z operation signal) output by the Z operation section 82*z* to the first communication section 132 through wireless communication same as the wireless communication in the second communication section 81. The XY operation section 82*xy* includes an XY sensor 822*xy* disposed in the sole of the left shoe. The Z operation section 82*z* includes a Z sensor 821*z* disposed in the sole of the right shoe. The XY sensor 822*xy* and the Z sensor 821*z* are load sensors that detect a distribution in a predetermined detection range of a load applied to the sole of the shoe from the sole of the foot.

Figure 16:
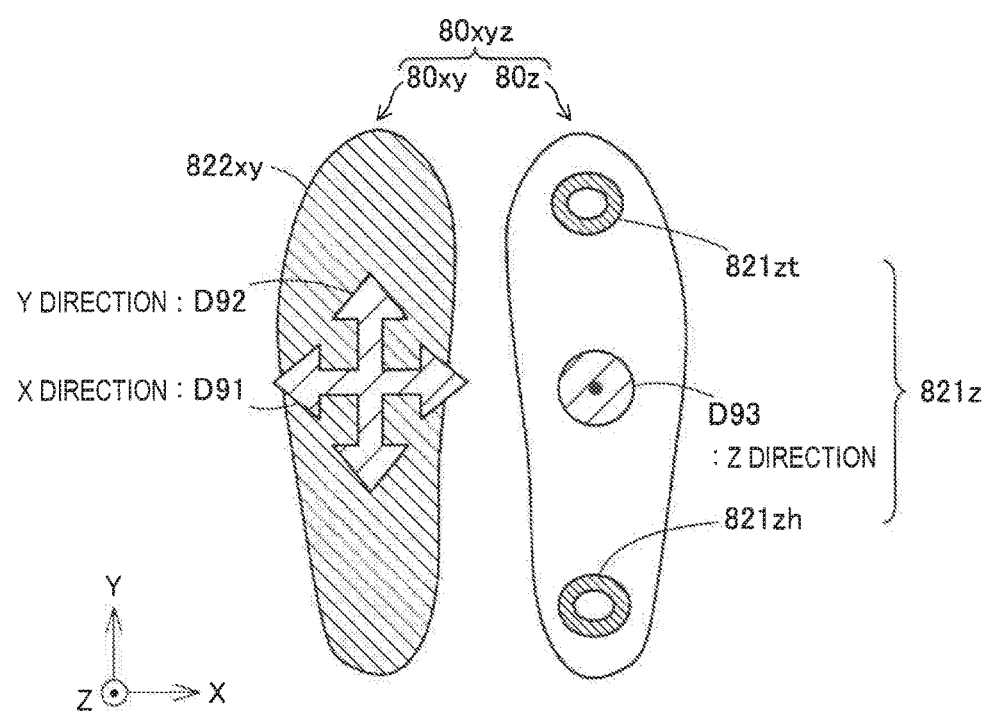
FIG. 16 is an explanatory diagram showing the position of an XY sensor and the position of a Z sensor.

FIG. 16 is an explanatory diagram showing the position of the XY sensor 822*xy* and the position of the Z sensor 821*z*. The XY sensor 822*xy* is disposed over the entire surface of the sole of the left shoe worn on the left foot of the user US. The Z sensor 821*z* is discretely disposed near the toe and near the heel of the sole of the right shoe of the user US. In the following explanation, the Z sensor 821*z* near the toe is referred to as "toe sensor 821*zt*" as well and the Z sensor 821*z* near the heel is referred to as "heel sensor 821*zh*" as well. Note that, in FIG. 16, an X axis, a Y axis, and a Z axis orthogonal to one another are shown in order to represent a relation between an operation direction and a load direction explained below. The X axis is an axis parallel to the left-right direction in FIG. 16, that is, the left-right direction of the user US. The Y axis is an axis parallel to the up-down direction in FIG. 16, that is, the front-back direction of the user US. The Z axis is an axis parallel to the vertical direction orthogonal to the surface of the sole of the shoe.

In the XY input section 80xy, in a state in which the XY sensor 822xy is detecting a distribution of a certain load, when the XY sensor 822xy detects a state of a changed distribution of the load, the change in the distribution of the load is resolved into a change component in a load direction D91 and a change component in a load direction D92 shown in FIG. 16. The load direction D91 is a direction parallel to the X direction and the load direction D92 is a direction parallel to the Y direction. Therefore, by setting a change in the load direction D91 as a change in the X direction and setting a change in the load direction D92 as a change in the Y direction, according to the change in the X direction and the change in the Y direction, it is possible to perform control and operation in the two directions. Making use of the above, the XY operation section 82xy (FIG. 15) of the XY input section 80xy outputs, according to the change in the distribution of the load detected by the XY sensor 822xy, an X operation signal (an X control signal) indicating the change in the X direction and a Y operation signal (a Y control signal) indicating the change in the Y direction. Note that a change amount of the distribution of the load in the load direction D91 (the X direction) can be set as an operation amount in the X direction. A change amount of the distribution of the load in the load direction D92 (the Y direction) can be set as an operation amount in the Y direction.

In the Z input section 80z, as explained below, the Z operation section 82z outputs, on the basis of a load of the toe sensor 821zt and a load of the heel sensor 821zh of the Z sensor 821z, a Z operation signal is Z control signal) indicating a change in the Z direction parallel to a load direction D93.

Figure 17:
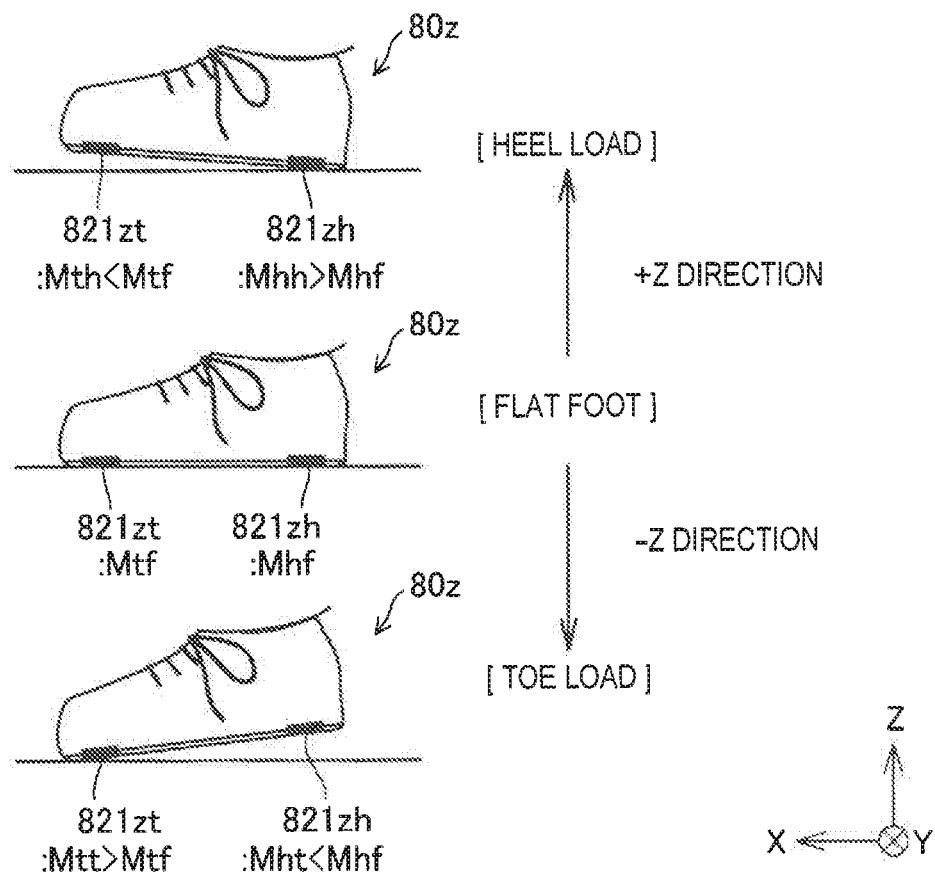
FIG. 17 is an explanatory diagram showing a relation between a load of a toe sensor and a load of a heel sensor and a tilt of a sole of a left foot.

FIG. 17 is an explanatory diagram showing a relation between the load of the toe sensor 821zt and the load of the heel sensor 821zh and a tilt of the sole of the left foot (the sole of the shoe). The load of the toe sensor 821zt in a state in which the foot is grounded on a grounding surface entirely from the toe to the heel (a flat foot state) is represented as Mtf and the load of the heel sensor 821zh in the state is represented as Mhf. When the toe is raised to apply a load to the heel, a load Mth of the toe sensor 821zt is smaller than the load. Mtf of the toe during the flat foot. Conversely, a load Mhh of the heel sensor 821zh is larger than the load. Mhf of the heel during the flat foot. Therefore, it is possible to detect a tilt of the sole of the left foot (the sole of the left shoe) from a change in a load of the toe and a change in a load of the heel on the basis of the load during the flat foot.

Making use of the above, the Z operation section 82z sets a change in a tilt to the heel load state (the toe raising state) as a change in a +Z direction and sets a change in a tilt to the toe load state (the heel raising state) as a change in a −Z direction and outputs a Z operation signal (a Z control signal) indicating a change in the Z direction. The change in the tilt to the heel load state (the toe raising state) may be set as a change in the −Z direction. The change in the tilt to the toe load state (the heel raising state) may be set as a change in the +Z direction. Note that, when the load Mtf of the toe and the load Mhf of the heel during the flat foot are calibrated to be Mtf=Mhf it is possible to detect, from a magnitude relation between a load Mt of the toe and a load Mh of the heel, the change in the tilt to the heel load state (the toe raising state) and the change in the tilt to the toe load state (the heel raising state).

Note that the magnitudes of the loads detected by the XY sensor 822xy and the Z sensor 821z (821zt and 821zh) are different according to a posture of the user US, for example, a standing state and a sitting state on a chair or the like. The loads tend to be large in the standing state and tend to be small in the sitting state. Therefore, it is desirable that a detection mode is switched according to a posture during operation by the user US to change a threshold for detecting a load.

Figure 18:
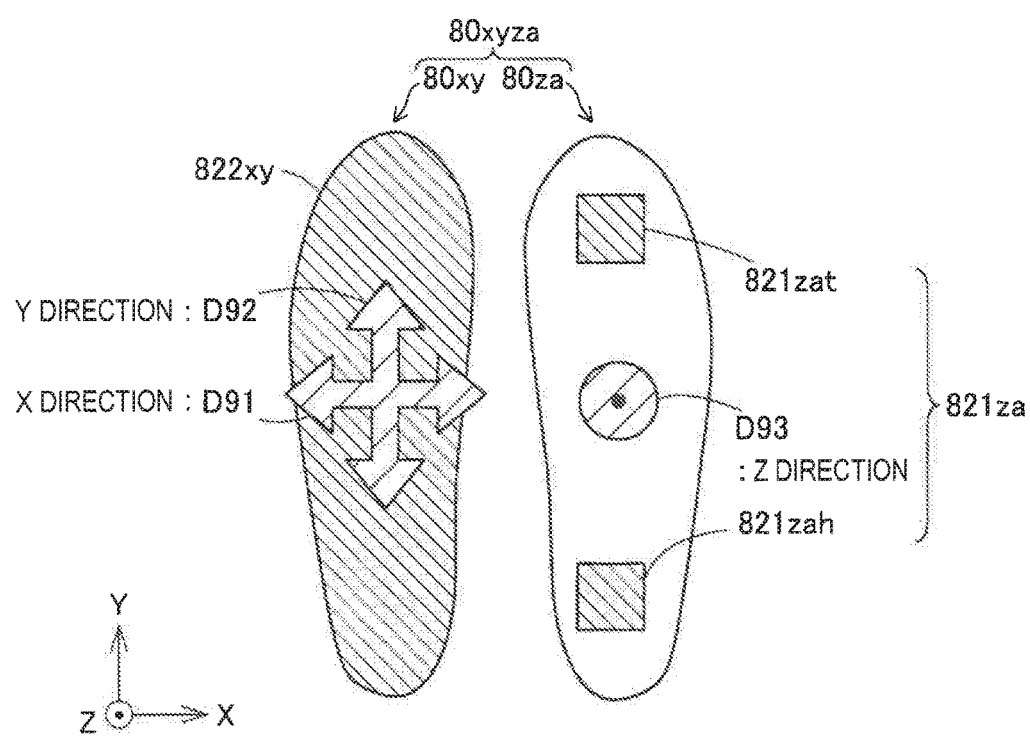
FIG. 18 is an explanatory diagram showing a Z input section of a three-dimensional foot input section in a modification.

FIG. 18 is an explanatory diagram showing a Z input section 80za of a three-dimensional foot input section 80xyza in a modification. The Z input section 80z of the three-dimensional foot input section 80xyz shown in FIG. 16 detects the change in the tilt of the sole of the foot according to the changes in the loads detected by the toe sensor 821zt and the heel sensor 821zh, in which the load sensors are used, and outputs the operation signal in the Z direction. On the other hand, the input section 80za in the modification is also capable of detecting the change in the tilt of the sole of the foot according to changes in accelerations and angular velocities detected by a toe sensor 821zat and a heel sensor 821zah, in which an acceleration sensor and an angular velocity sensor are used, and outputting the operation signal in the Z direction. In this case, sudden changes in the accelerations and the angular velocities caused by tapping or pumping the foot can be detected. Therefore, making use of the above, the number of times of the tapping or the number of times of the pumping may be detected and set as an operation amount.

As explained above, by outputting the two kinds of operation signals in the X direction and the Y direction with the XY input section 80xy and outputting one kind of operation signal in the Z direction with the Z input sections 80z and 80za, the three-dimensional foot input sections 80xyz and 80xyza can output the operation signals in the three directions (the three dimensions) of X, Y, and Z according to operation inputs by both the feet of the user US. Note that the three-dimensional foot input section 80xyz is equivalent to the "foot input device" in the appended claims. The XY operation section 82xy is equivalent to the "two-kind operation section" in the appended claims. The Z operation section 822 is equivalent to the "one-kind operation section" in the appended claims. The operation signal in the X direction (the X operation signal) is equivalent to the "first operation signal" in the appended claims. The operation signal in the Y direction (the Y operation signal) is equivalent to the "second operation signal" in the appended claims. The operation signal in the Z direction (the Z operation signal) is equivalent to the "third operation signal" in the appended claims.

The user US can perform various kinds of operation explained below by operating the three-dimensional foot input sections 80xyz and 80xyza.

Figure 19:
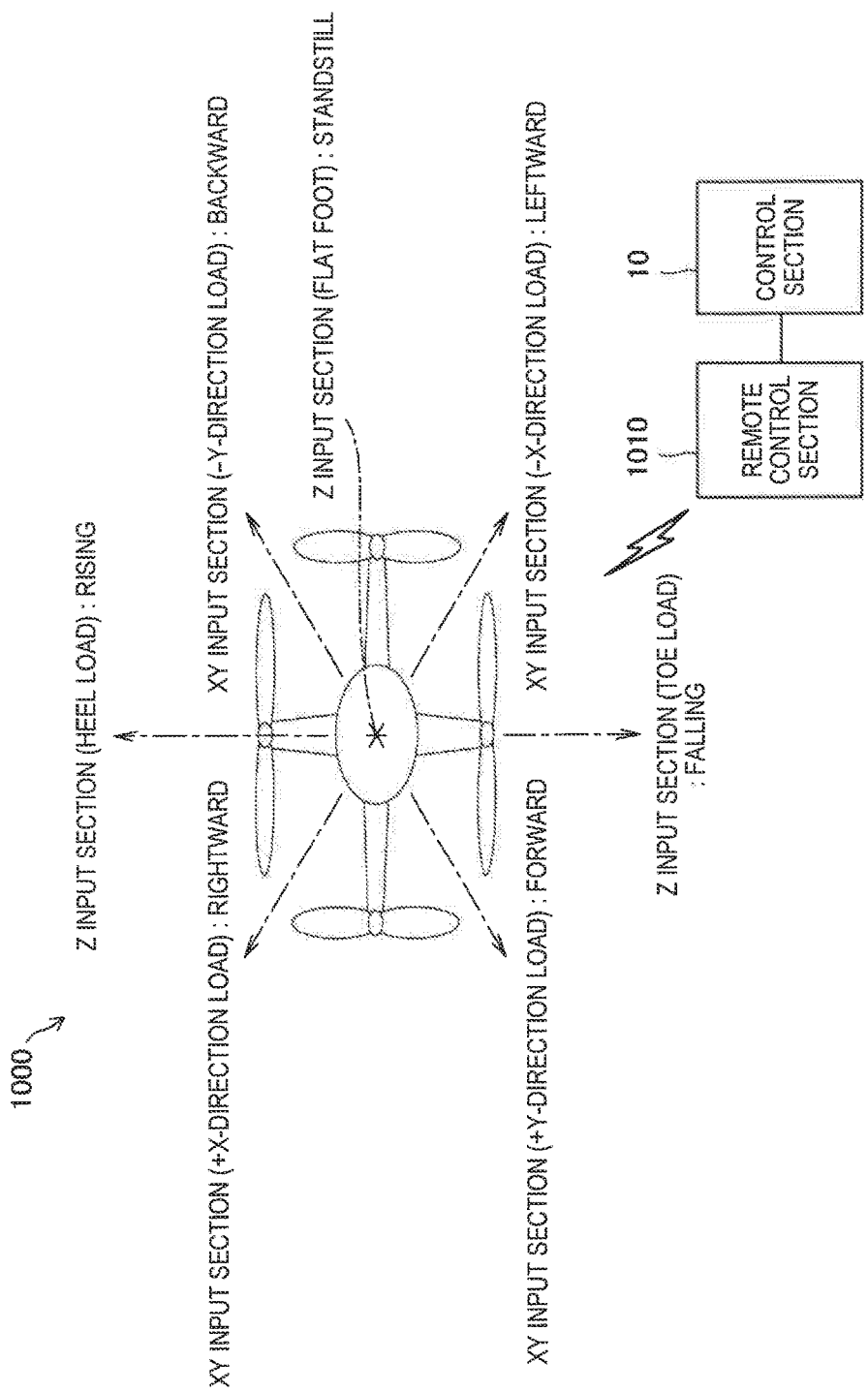
FIG. 19 is an explanatory diagram showing an example in which the three-dimensional foot input section is applied to remote operation of an unmanned aircraft.

FIG. 19 is an explanatory diagram showing an example in which the three-dimensional foot input section 80xyz is applied to remote operation of an unmanned aircraft 1000. A remote control section 1010 of the unmanned aircraft (a so-called drone) 1000 is connected to the control section 10 of the HMD. The remote control section 1010 can remotely control the unmanned aircraft 1000 according to operation signals in the three directions of X, Y, and Z output from the three-dimensional foot input section 80xyz (FIG. 15). For example, it is possible to operate movements in the front-back direction of the unmanned aircraft 1000 according to the operation signal in the Y direction (the Y operation signal) output from the XY input section 80xy (FIG. 15). It is possible to operate movements in the left-right direction of the unmanned aircraft 1000 according to the operation signal in the X direction (the X operation signal). It is possible to operate movements (rising, standstill, and falling) in the vertical direction of the unmanned aircraft 1000 according to the operation signal in the Z direction (the Z operation signal) output from the Z input section 80z (FIG. 15). Note that the functions of the remote control section 1010 may be incorporated in the control section 10 of the HMD.

Figure 20:
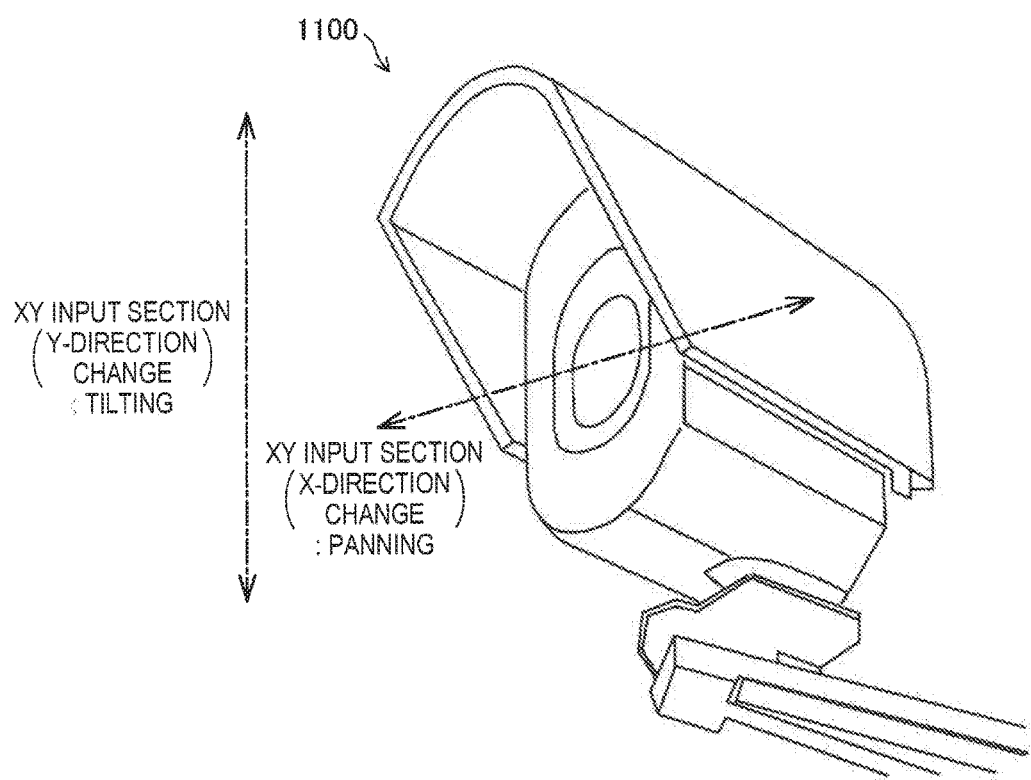
FIG. 20 is an explanatory diagram showing an example in which the three-dimensional foot input section is applied to remote operation of a camera.
Figure 21:
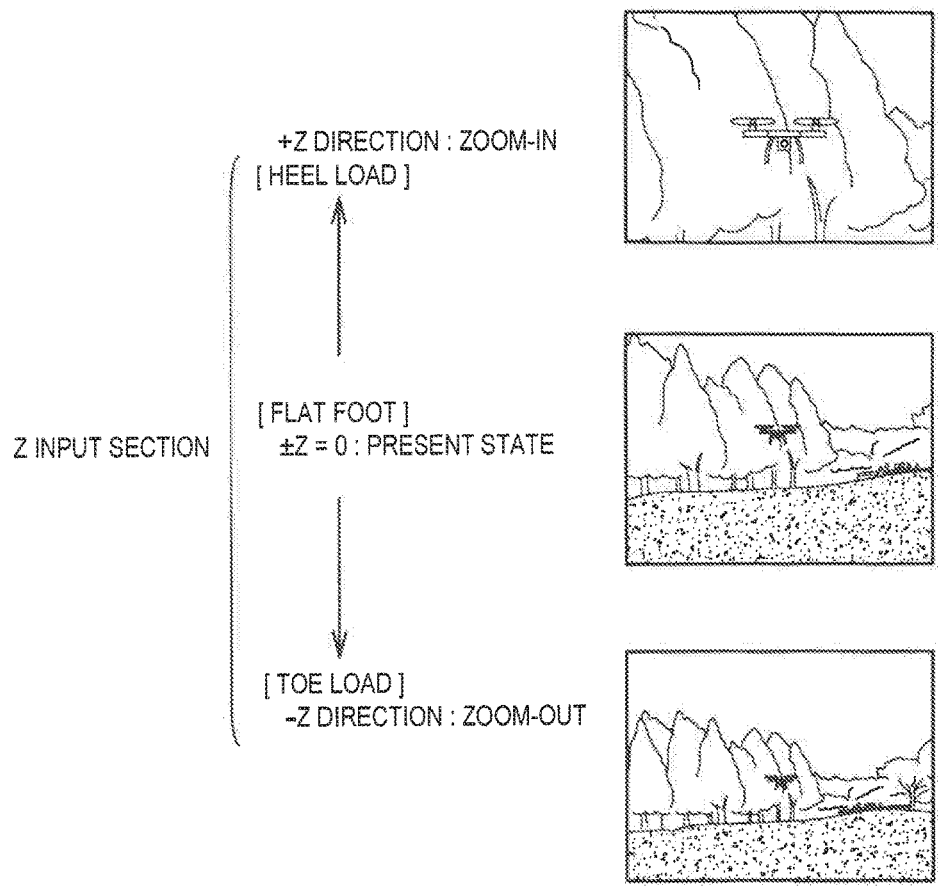
FIG. 21 is an explanatory diagram showing an example in which the three-dimensional foot input section is applied to the remote operation of the camera.

FIGS. 20 and 21 are explanatory diagrams showing an example in which the three-dimensional foot input section 80xyz is applied to remote operation of a camera 1100. The camera 1100 connected to the control section 10 of the HMD via a network line or the like can be remotely operated according to the operation signals in the three directions of X, Y, and Z output from the three-dimensional foot input section 80xyz (FIG. 15). For example, as shown in FIG. 20, it is possible to perform tilting operation for moving the direction of a lens of the camera 1100 up and down according to the operation signal in the Y direction (the Y operation signal) output from the XY input section 80xy (FIG. 15). It is possible to perform panning operation for horizontally moving the direction of the lens of the camera 1100 according to the operation signal in the X direction (the X operation signal). As shown in FIG. 21, states of zooming (zoom-in, present state, and zoom-out) of the camera 1100 can be operated according to the operation signal in the Z direction (the Z operation signal) output from the Z input section 80z (FIG. 15).

Note that the application example shown in FIG. 19 and the application example shown in FIGS. 20 and 21 are only examples. Application of the three-dimensional foot input section 80xyz is not limited to the examples. The three-dimensional foot input section 80xyz is applicable to remote operation of a robot, an automobile, a ship, and an airplane, remote operation of toys of the robot, the automobile, the ship, and the airplane, and remote operation of various moving apparatuses connected to the HMD either by radio or by wire to be remotely operable and movable in the three-dimensional directions. The three-dimensional foot input section 80xyz is also applicable to remote operation of various moving apparatuses connected to a wearable device other than the HMD to be remotely operable and movable in the three-dimensional directions.

Figure 22:
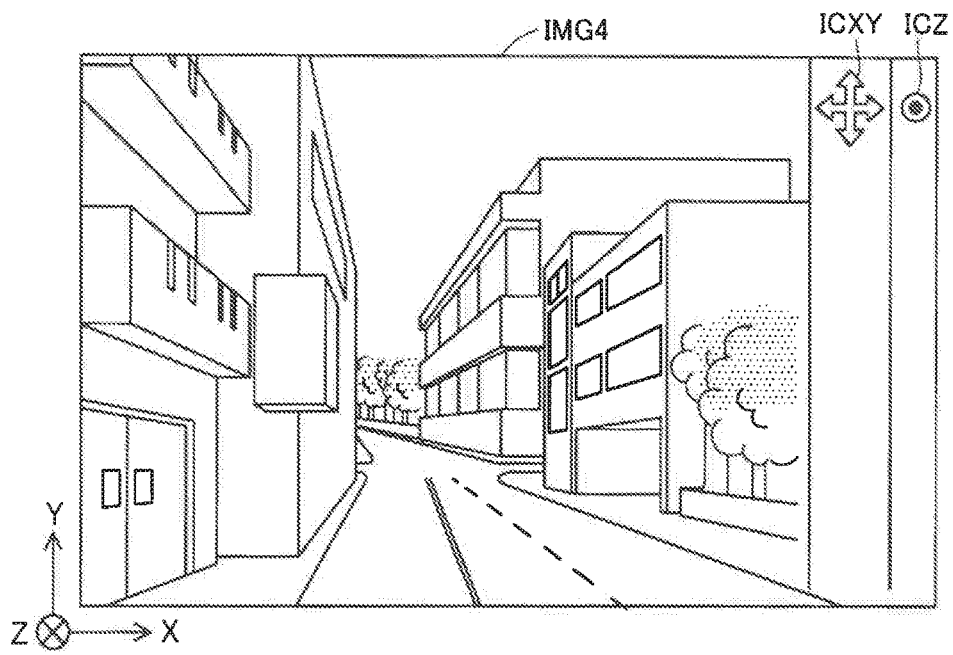
FIG. 22 is an explanatory diagram showing an example in which the three-dimensional foot input section is applied to operation of a display image displayed on an optical-image display section.

FIG. 22 is an explanatory diagram showing an example in which the three-dimensional foot input section 80xyz is applied to operation of a display image IMG4 displayed on the optical-image display sections 26 and 28. A lateral direction in a screen of the display image IMG4 is set in the X direction, a longitudinal direction in the screen is set as the Y direction, and a depth direction in the screen is set in the Z direction. A state of the display image IMG4 can be changed according to the operation signals in the three directions of X, Y, and Z output from the three-dimensional foot input section 80xyz by the operation by the user US. For example, when a change in the direction is instructed by the operation signal in the Z direction, the display image IMG4 can be changed to an image in a forward position. When a change in the −Z direction is instructed, the display image IMG4 can be changed to an image in a backward position. The same holds true concerning the operation signal in the X direction and the operation signal in the Y direction. That is, it is possible to perform control for changing appearance of a state image of a displayed image according to the operation signals in the three directions of X, Y, and Z. Although not shown in the figure, the position of a pointer indicating a position in the display image IMG4 can be pointed by coordinates in the three directions of X, Y, and Z.

Figure 23:
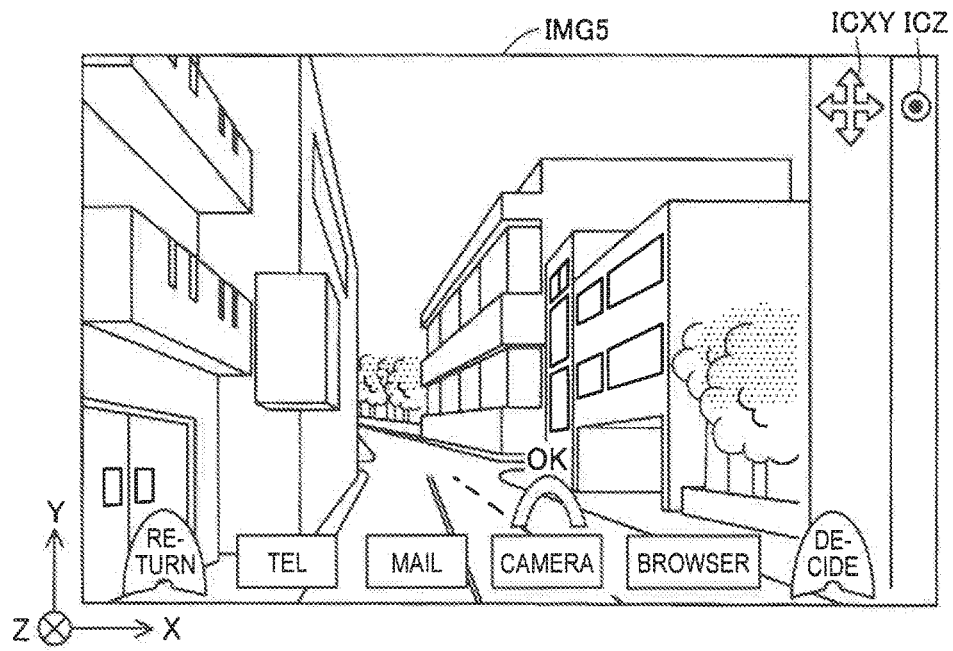
FIG. 23 is an explanatory diagram showing an example in which the three-dimensional foot input section is applied to operation of a display image displayed on the optical-image display section.

FIG. 23 is an explanatory diagram showing an example in which the three-dimensional foot input section 80xyz is applied to operation of a display image IMG5 displayed on the optical-image display sections 26 and 28. FIG. 23 shows the display image IMG5 in which an image of an input frame having a menu around a lower frame is set to be superimposed on the display image IMG4 shown in FIG. 22. A shift to a foot input mode and display of the input frame are performed while being triggered by, for example, the user US wearing the HMD viewing the feet, whereby the foot on which the three-dimensional foot input section 80xyz is worn is recognized from a picked-up image of the camera 60 of the HMD. However, the trigger of the display of the input frame is not limited to this. As the trigger of the display of the input frame, a motion less easily misrecognized among various motions of the user US only has to be decided and set in advance.

The user US can execute selection operation for the displayed menu by operating the three-dimensional foot input section 80xyz. When the menu is arranged around the lower frame, it is possible to operate the three-dimensional foot input section 80xyz while visually recognizing the feet of the user US see-through displayed to be superimposed in the display image IMG5. It is possible to improve operability for the user US.

G. Modifications

Note that the invention is not limited to the embodiments and can be carried out in various forms without departing from the spirit of the invention. For example, modifications explained below are also possible.

G-1. Modification 1

In the first embodiment, the load-detection-type foot input section 80 detects the distribution of the load applied to the sole of the shoe. The "load" in the specification and the appended claims include concepts of pressure and vibration as well. For example, the load-detection-type foot input section 80 may be any one of a pressure sensor, a pressure sensitive sensor, a shock sensor, and a contact sensor. In the example explained in the first embodiment, the load-detection-type foot input section 80 is disposed in the sole of the shoe. However, the load-detection-type foot input section 80 may be directly formed in the shoe rather than being the insole in the first embodiment. The load-detection-type foot input section 80 may be a sandal type or may be worn on the outer side of the shoe.

Figure 24:
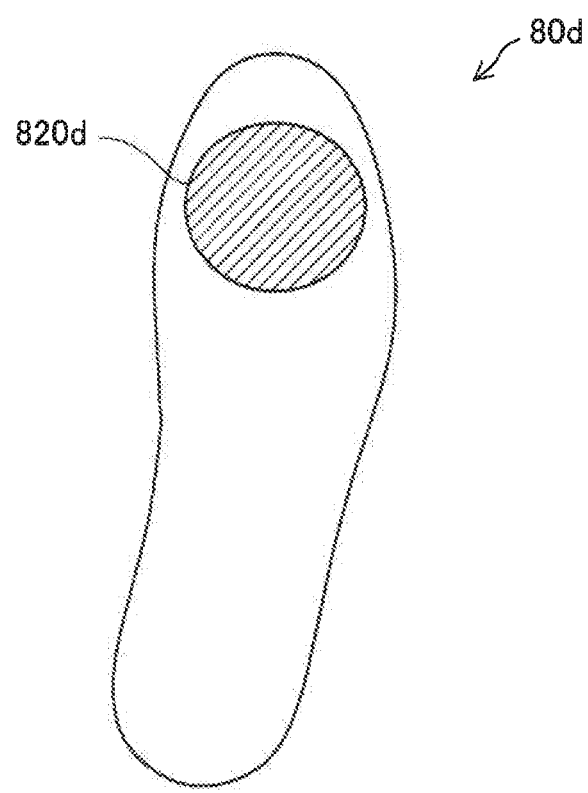
FIG. 24 is an explanatory diagram showing the position of a second operation section in a modification 1 disposed in a sole of a shoe.

In the first embodiment, the sensor 820 of the second operation section 82 is disposed to correspond to the position where the big toe of the user US is placed in the sole of the shoe worn by the user US. However, a position where the sensor 820 is disposed can be variously modified. FIG. 24 is an explanatory diagram showing the position of a sensor 820d in a modification 1 disposed in the sole of the shoe. As shown in FIG. 24, as the sensor 820d of a load-detection-type foot input section 80d in the modification 1, a load sensor is disposed in a portion corresponding to the position of the base of the five toes of the right foot of the user US in the right shoe worn on the right foot of the user US. With the load-detection-type foot input section 80d in this modification, the user US can control the display image on the optical-image display sections 26 and 28 with the entire weight of the right foot rather than with the toes of the right foot. Note that, in the other embodiments, the load sensor may be disposed over the entire surface of the sole of the foot. A position where the load sensor is disposed may be different in the right foot and the left foot.

G-2. Modification 2

In the embodiments, as the display image set by the image setting section 165, the change in the display position of the arrow image CS1 is mainly explained. However, the set display image can be variously modified. For example, functions corresponding to click, double click, and drag of a mouse, which is a user interface of a PC, may be executed according to the change in the load detected by the load-detection-type foot input section 80. A change involved in the execution may be output as a change of an image.

Figure 25:
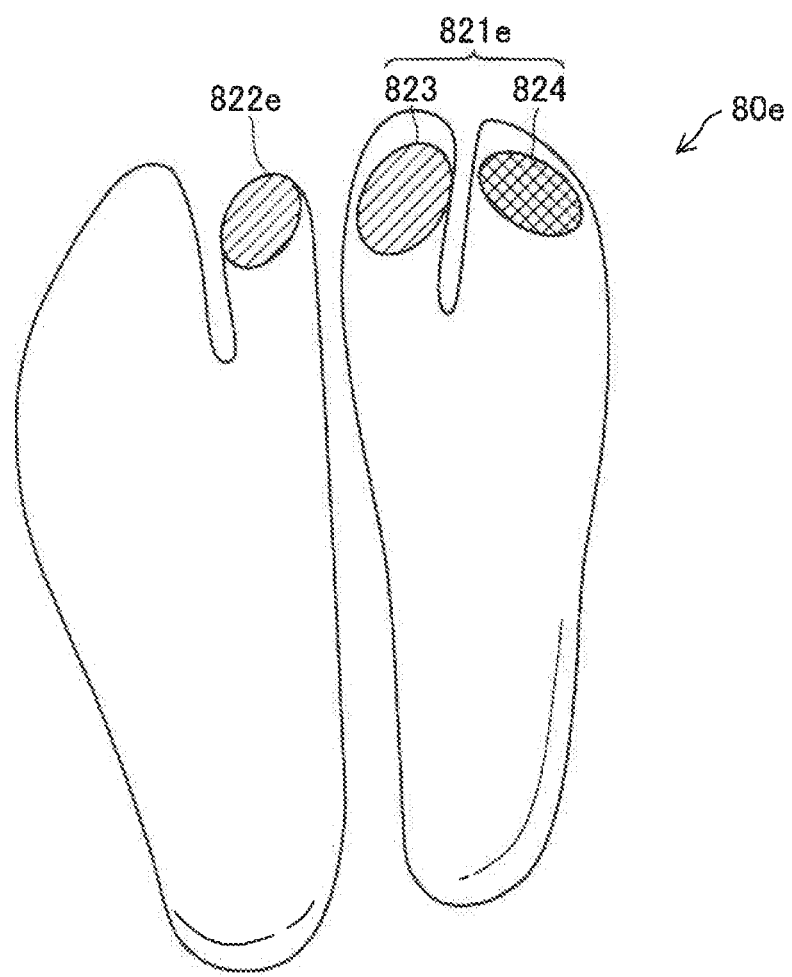
FIG. 25 is an explanatory diagram showing the positions of load-detection-type foot input sections in a modification 2 disposed in soles of shoes.

FIG. 25 is an explanatory diagram showing the position of a load-detection-type foot input section 80e in a modification 2 disposed in the soles of the shoes. Like the load-detection-type foot input section 80a in the second embodiment, the load-detection-type foot input section 80e in the modification 2 includes a right foot sensor 821e and a left foot sensor 822e. As in the second embodiment, the left foot sensor 822e is disposed in the position corresponding to the big toe of the left foot of the user US in the left shoe worn on the left foot of the user US. The right foot sensor 821e includes a first right foot sensor 823 and a second right foot sensor 824. The first right foot sensor 823 is disposed in a position corresponding to the big toe of the right foot of the user US in the right shoe worn on the right foot of the user US. The second right foot sensor 824 is disposed in a position corresponding to the third toe and the little toe of the right foot of the user US in the right shoe worn on the right foot of the user US. When a load equal to or larger than a threshold set in advance is applied, the left foot sensor 822e, the first right foot sensor 823, and the second right foot sensor 824 detect the load as an ON signal corresponding to pressing of a button. When detecting the load equal to or larger than the threshold, the left foot sensor 822e is equivalent to a function of double click (left) of the mouse. When detecting the load equal to or larger than the threshold, the first right foot sensor 823 is equivalent to a function of left click of the mouse. When detecting the load equal to or larger than the threshold, the second right foot sensor 824 is equivalent to right click of the mouse. Setting of the functions of the left foot sensor 822e, the first right foot sensor 823, and the second right foot sensor 824 can be variously modified. When detecting the load equal to or larger than the threshold twice or more within a predetermined time, the left foot sensor 822e may execute the function of the double click. In the modification 2, it is possible to execute not only the change of the display position of the arrow image CS1 but also control for determining various menus and a change of a display image based on the control.

G-3. Modification 3

Figure 26:
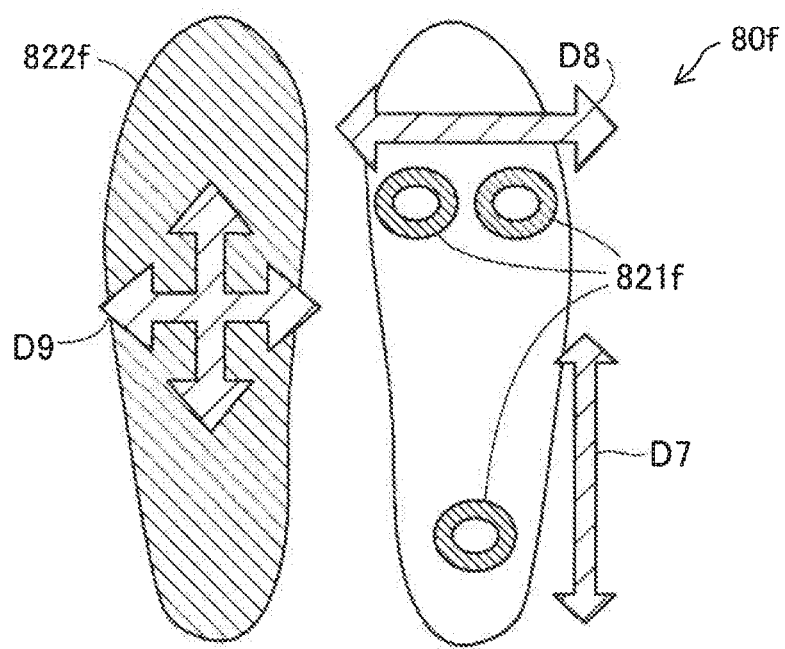
FIG. 26 is an explanatory diagram showing the positions of load-detection-type foot input sections in a modification 3 disposed in soles of shoes.

FIG. 26 is an explanatory diagram showing the position of a load-detection-type foot input section 80f in a modification 3 disposed in a sole of a shoe. Like the load-detection-type foot input section 80a in the second embodiment, the load-detection-type foot input section 80f in the modification 3 includes a left foot sensor 822f and a right foot sensors 821f. As shown in FIG. 26, the left foot sensor 822f is a load, sensor disposed over the entire surface of a sole of a left shoe worn on the left foot of the user US. When the left foot sensor 822f detects a change in a distribution of a load in a state in which the right foot sensors 821f are detecting loads, an image setting section 165f changes the display position of the arrow image CS1 along four directions of a load direction D9. When the left foot sensor 822f detects a change in a distribution of a load in a state in which the right foot sensors 821f are not detecting loads (e.g., a state in which the user US raises the right foot), the image setting section 165f sets a display image functioning as control of "determination". The right foot sensors 821f are load sensors partially disposed in a sole of a right shoe worn on the right foot of the user US.

As shown in FIG. 26, the right foot sensors 821f are discretely disposed in three places of the sole of the shoe. One is disposed in a position corresponding to the base of the big toe. One of the remaining two is disposed in a position corresponding to the base of the little toe. The remaining one is disposed in a position corresponding to the heel. When the left foot sensor 822f is detecting a load, the image setting section 165f changes the display position of the arrow image CS1 along a load direction D8 according to changes in distributions of loads detected by the two load sensors in the positions corresponding to the bases of the big toe and the little toe in the right foot sensors 821f. The image setting section 165f changes the display position of the arrow CS1 along a load direction D7 orthogonal to the load direction D8 according to changes in loads detected by the load sensor disposed in the heel in the right sensors 821f and at least one of the load sensor corresponding to the position of the big toe and the load sensor corresponding to the position of the little toe in the right foot sensors 821f. When the load sensor of any one of the right foot sensors 821f detects a change in a load in a state in which the left foot sensor 822f is not detecting a load, the image setting section 165f sets a display image functioning as control of "determination" As explained above, the image setting section 165f may change setting of a display image allocated to a load detected by the load-detection-type foot input section 80f according to a combination of loads detected in the right foot and the left foot of the user US.

G-4. Modification 4

In the embodiments, the change of the display positions of the arrow images CS1 and CS2 is explained. However, the arrow images CS1 and CS2 themselves may be changed according to a load detected by the load-detection-type foot input section 80. For example, in the load-detection-type foot input section 80f in the modification 3, the image setting section 165f may set a color and a shape of the arrow image CS1 to be different when the display position of the arrow image CS1 is changed according to the load detected by the left foot sensor 822f and when the display position of the arrow image CS1 is changed according to the loads detected by the right foot sensors 821f.

G-5. Modification 5

In the embodiments, users US are not taken into account. However, the HMD 100 may be set to correspond to the respective users US. For example, a threshold of a load detected by the load-detection-type foot input section 80 may be set to different numerical values for the respective users US by setting the weights of the respective users US in advance.

Since areas and shapes of soles of feet in contact with soles of shoes are different depending on the users US, a change in a load detected by the load-detection-type foot input section 8L may be set to corresponding to the shape of the sole of the foot of each of the users US. For example, before operation is executed according to a detection value of the load-detection-type foot input section 80, data at the time when the user US applies a load to the right and at the time when the user US applies a load to the heel may be acquired in advance. A threshold of a load detected by the load-detection-type foot input section 80 and a degree of a change in a direction of the load may be set on the basis of the acquired data.

G-6. Modification 6

In the fourth embodiment, the image setting section 165*c* sets the display image according to the combination of the detection value of the load-detection-type foot input section 80*c* and the detection value of the inertial sensor 90. However, different kinds of control may be respectively associated with the detection value of the load-detection-type foot input section 80*c* and the detection value of the inertial sensor 90. For example, the image setting section 165*c* may change the display position of the arrow image CS1 according to the detection value of the load-detection-type foot input section 80 and set the display image corresponding to the function of "determination" according to the detection value of the inertial sensor 90.

G-7. Modification 7

In the embodiments, the battery 83 included in the load-detection-type foot input section 80 may be formed using a piezoelectric element and may store electric power generated by movement of the user US.

G-8. Modification 8

In the embodiments, the load-detection-type foot input section 80 detects the change in the distribution of the load. However, the load-detection-type foot input section 80 does not always need to detect the distribution of the load. For example, the load-detection-type foot input section 80 may detect a change in a load of the sole of the foot of the user US according to loads applied to a discretely disposed plurality of load sensors. The load-detection-type foot input section 80 may detect only a load at one point. The image setting section 165 may set a display image corresponding to "determination" according to the detection of the load.

G-9. Modification 9

In the first embodiment, the moving state is explained as an example of the activity state of the user US specified by the state specifying section 168. However, the activity state of the user US can be variously modified. Examples of the activity state of the user US include a step at a constant cycle, a front load generated when the user US leans forward, a rear load opposite to the front load, a right load, and a left load. The state specifying section 168 can also combine changes in activity states at predetermined times or a predetermined plurality of timings. The image setting section 165 can set a display image on the basis of the activity states and combinations of the activity states of the user US specified by the state specifying section 168.

G-10. Modification 10

In the fifth embodiment, the image setting section 165 displays, on the right side of the display image IMG3 displayed on the right optical-image display section 26, the input section image IM80 representing the load-detection-type foot input section 80 worn on the right foot of the user US. However, a display form of the input section image IM80 can be variously modified. For example, when the load-detection-type foot input section 80 is worn on the left foot of the user US, the image setting section 165 may cause only the left optical-image display section 28 to display the input section image IM80.

G-11. Modification 11

The image setting section 165 may cause, concerning the load sensors in the predetermined range shown in FIG. 25, the optical-image display sections 26 and 28 to display, in the display image IMG3, an image of a bar graph that changes on a real time basis in order to indicate which degree of a load is applied to which portion. When the load-detection-type foot input section includes the plurality of load sensors allocated with the specific functions shown in FIG. 26, the image setting section 165 may cause the optical-image display sections 26 and 28 to display, in the display image IMG3, an image indicating which functions correspond to which load sensors. The image setting section 165 may cause the optical-image display sections 26 and 28 to display, instead of the input section image IM80 representing the surface shape of the sole of the shoe, a character image of "right foot big toe" indicating a position where the load sensor such the second operation section 82 is disposed.

G-12. Modification 12

In the explanation in the sixth embodiment, it is desirable to switch the detection mode according to the posture of the user US during the operation and change the threshold for detecting a load. The same applies in the other first to fifth embodiments.

G-13. Modification 13

In addition to the load sensor, inertial sensors such as an angular velocity sensor and an acceleration sensor may be mounted on the foot input sections in the embodiments. It is possible to perform a variety of kinds of control by combining load detection by the load sensor and detection of a movement by the inertial sensors. For example, by detecting the direction of a movement, the strength of the movement, and the like of the feet with the angular velocity sensor worn on the other foot while detecting a load with the load sensor worn on one foot, it is possible to control a movement of an image AR (Augmented Reality)-displayed on the image display section of the HMD.

G-14. Modification 14

The selection operation the menu explained with reference to FIG. 23 is not limited to the three-dimensional foot input section 80*xyz* in the sixth embodiment and can also be applied in the load-detection-type foot input sections 80, 80*a*, 80*c*, 80*d*, 80*e*, and 80*f* in the other embodiments and the modifications.

G-15. Modification 15

In the explanation with reference to FIG. 23, the shift to the foot input mode and the display of the input frame are performed while being triggered by, for example, the user us wearing the HMD viewing the feet, whereby the foot on which the three-dimensional foot input section 80*xyz* is worn is recognized from a picked-up image of the camera 60 of the HMD. However, the shift to the foot input mode is not limited to this. For example, the shift to the foot input mode may be performed by detecting a state of the sole of the foot set in advance with the load sensor as the trigger of the shift to the foot input mode. The shift to the foot input mode may be performed by detecting a predetermined foot action of the other foot with the inertial sensors while detecting a load with the load sensor worn on one foot. That is, the shift to the foot input mode only has to be able to be detected by detecting a predetermined state of the foot as the trigger of the shift to the foot input mode. Detection of any state of the foot can be set as the trigger of the shift to the foot input mode.

G-16. Modification 16

In the sixth embodiment, the example is explained in which the XY input section 80*xy* and the Z input section 80*z* of the three-dimensional foot input section 80*xyz* are disposed as the insole of the sole of the shoe. However, the XY input section 80*xy* and the Z input section 80*z* may be incorporated in the sole of the shoe. The three-dimensional foot input section 80*xyz* may be a sandal type rather than the shoe. The XY input section 80xy and the Z input section 80z may be worn on the outer side of the shoe rather than in the shoe.

G-17. Modification 17

In the embodiments, the first operation section 135 is formed in the control section 10. However, a form of the first operation section 135 can be variously modified. For example, a user interface, which is the first operation section 135, may be provided separately from the control section 10. In this case, since the first operation section 135 is separate from the control section 10 in which the power supply 130 and the like are formed, the first operation section 135 can be reduced in size. The operability for the user US is improved. In the embodiments, the camera 60 is disposed in the image display section 20. However, the camera 60 may be configured separately from the image display section 20 and may be able to pick up an image of an outside scene. In the HMD 100, all of the CPU 140, the power supply 130, and the like configuring the control section 10 may be mounted on the image display section 20. Since the HMD 100 does not include a controller configured separately from the image display section 20, the HMD 100 can be further reduced in size. CPUs 140 may be respectively mounted on the control section 10 and the image display section 20 to use the control section 10 as a standalone controller and use the image display section 20 as a standalone display device.

For example, the image-light generating section may include an organic EL (organic electro-luminescence) display and an organic-EL control section. For example, as the image-light generating section, a LCOS (Liquid Crystal on Silicon; LCOS is a registered trademark), a digital micromirror device, and the like can also be used instead of the LCD. For example, the invention can also be applied to the HMD 100 of a laser retinal projection type. An image display maximum region PN may be configured by a display of a HEMS shutter system that opens and closes HEMS shutters formed in pixels.

In the HMD 100, a scanning optical system including a HEMS mirror may be adopted and a HEMS display technique may be used. As a specific configuration, the HMD 100 may include, as a light emitting section, a signal-light forming section, a scanning optical system including a MEMS mirror that scans light emitted by the signal-light forming section, and an optical member on which a virtual image is formed by the light scanned by the scanning optical system. When the HMD 100 includes this configuration, the light emitted by the signal-light forming section is reflected by the MEMS mirror, made incident on the optical member, and guided by the optical member to reach a virtual image formation surface (e.g., a reflection surface). The MEMS mirror scans the light, whereby a virtual image is formed on the virtual image formation surface. The user US visually recognizes the formed virtual image to recognize an image.

For example, the HMD 100 may be a head mounted display of a form in which the optical-image display section covers only a part of the eyes of the user US, in other words, a form in which the optical-image display section does not completely cover the eyes of the user US. The HMD 100 may be a head mounted display of a so-called monocular type, instead of the HMD 100, a hand-held display manually fixed in a position by the user US like a binocular rather than being mounted on the head of the user US may be used as an image display device. In the embodiments, the HMD 100 is a binocular optical transmission type. However, the invention can also be applied to head-mounted display devices of other types such as a video transmission type.

The HMD 100 may be used as a display device for only displaying an image based on an image signal received from another device. Specifically, the HMD 100 may be used as a display device equivalent to a monitor of a desktop PC. For example, the HMD 100 may receive an image signal from the desktop PC to display an image in the image display maximum region PN of the image display section 20.

The HMD 100 may be used to function as a part of a system. For example, the HMD 100 may be used as a device for executing a part of functions of a system including an airplane. A system in which the HMD 100 is used is not limited to the system including the airplane and may be systems including an automobile and a bicycle.

G-18. Modification 18

As the earphones, an ear hook type or a headband type may be adopted. The earphones may be omitted. For example, the HMD 100 may be configured as a head-mounted display device mounted on vehicles such as an automobile and an airplane. For example, the HMD 100 may be configured as a head-mounted display device incorporated in a body protector such as a helmet.

G-19. Modification 19

The configurations of the HMD 100 in the embodiments are only examples and can be variously modified. For example, the direction key 16 provided in the control section 10 may be omitted. Another interface for operation such as a stick for operation may be provided in addition to the direction key 16 and the track pad 14. Input devices such as a keyboard and a mouse may be connectable to the control section 10. The control section 10 may receive inputs from the keyboard and the mouse.

G-20. Modification 20

As the image display section, instead of the image display section 20 worn like eyeglasses, an image display section of another type such as an image display section worn like a cap may be adopted. The earphones 32 and 34 can be omitted as appropriate. In the embodiments, the LCD and the light source are used as the components that generate image light. However, instead of the LCD and the light source, another display element such as an organic EL display may be adopted.

Figure 27:
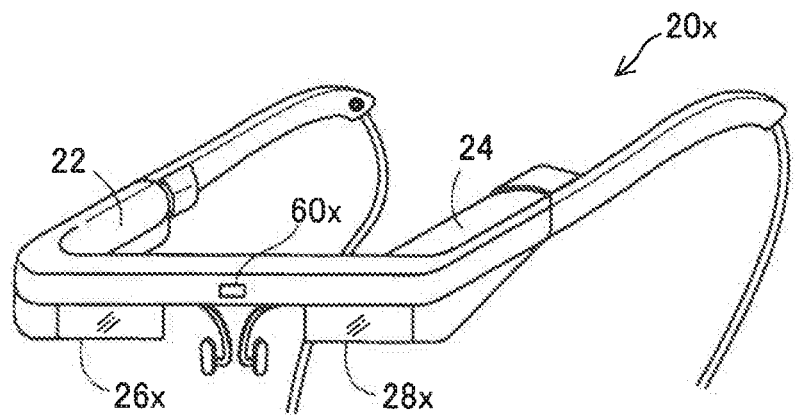
FIG. 27 is an explanatory diagram showing an exterior configuration of an HMD in a modification.
Figure 28:
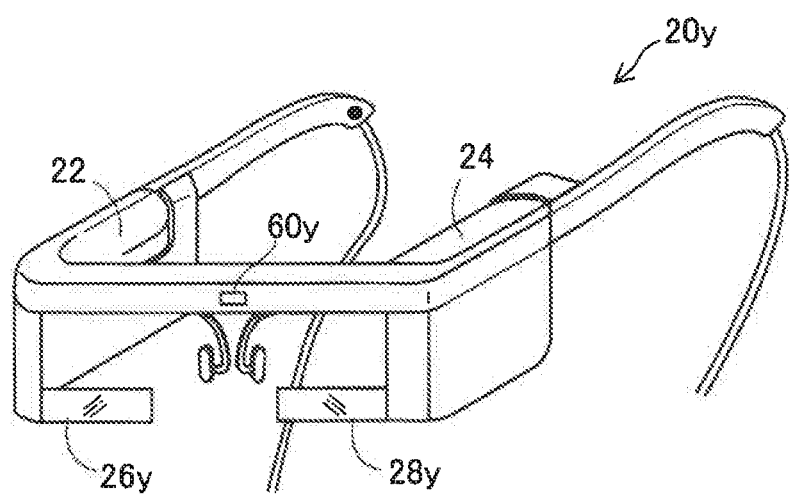
FIG. 28 is an explanatory diagram showing an exterior configuration of an HMD in a modification.

FIGS. 27 and 28 are explanatory diagrams showing the exterior configurations of HMDs in a modification. In the case of an example shown in FIG. 27, the HMD is different from the HMD 100 shown in FIG. 2 in that an image display section 20x includes a right optical-image display section 26x instead of the right optical-image display section 26 and includes a left optical-image display section 28x instead of the left optical-image display section 28. The right optical-image display section 26x is formed smaller than the optical member in the embodiments and disposed obliquely above the right eye RE of the user US during wearing of an HMD 100x. Similarly, the left optical-image display section 28x is formed smaller than the optical member in the embodiments and disposed obliquely above the left eye LE of the user US during wearing of the HMD 100x. In the case of an example shown in FIG. 28, the HMD is different from the HMD 100 shown in FIG. 2 in that an image display section 20y includes a right optical-image display section 26y instead of the right optical-image display section 26 and includes a left optical-image display section 28y instead of the left optical-image display section 28. The right optical-image display section 26y is formed smaller than the optical member in the embodiments and disposed obliquely below the right eye RE of the user US during wearing of an HMD 100y, The left optical-image display section 28y is formed smaller than the optical member in the embodiments and disposed obliquely below the left eye LE of the user US during wearing of the HMD 100y. In this way, the optical-image display sections only have to be disposed in the vicinity of the eyes of the user US. The size of the optical members forming the optical-image display sections may be any size. The HMD 100 can be realized in which the optical-image display sections cover only a part of the eyes of the user US, in other words, the optical-image display sections do not completely cover the eyes of the user US.

G-21. Modification 21

In the embodiments, the HMD 100 may guide image lights representing the same image to the left and right eyes of the user US and cause the user US to visually recognize a two-dimensional image or may guide image lights representing different images to the left and right eyes of the user US and cause the user US to visually recognize a three-dimensional image.

G-22. Modification 22

In the embodiments, a part of the components realized by hardware may be replaced with software. Conversely, a part of the components realized by software may be replaced with hardware. For example, in the embodiments, the image processing section 160 and the sound process g section 170 are realized by the CPU 140 reading out and executing the computer program. However, these functional sections may be realized by hardware circuits.

When a part or all of the functions of the invention are realized by software, the software (a computer program) can be provided while being stored in a computer-readable recording medium. In the invention, the "computer-readable recording medium" is not limited to portable recording media such as a flexible disk and a CD-ROM and includes various internal storage devices in a computer such as a RAM and a ROM and external storage devices fixed to the computer such as a hard disk.

G-23. Modification 23

In the embodiments, as shown in FIGS. 2 and 3, the control section 10 and the image display section 20 are formed as the separate components. However, the configuration of the control section 10 and the image display section 20 is not limited to this and can be variously modified. For example, on the inside of the image display section 20, all of the components formed in the control section 10 may be formed or a part of the components may be formed. The power supply 130 in the embodiments may be independently formed and configured to be replaceable. The components formed in the control section 10 may be redundantly formed in the image display section 20. For example, the CPU 140 shown in FIG. 3 may be formed in both of the control section 10 and the image display section 20. Functions performed by the CPU 140 formed in the control section 10 and the CPU formed in the image display section 20 may be divided.

The invention is not limited to the embodiments and the modifications explained above and can be realized in various configurations without departing from the spirit of the invention. For example, the technical features in the embodiments and the modifications corresponding to the technical features in the aspects described in the summary of the invention can be replaced or combined as appropriate in order to solve a part or all of the problems or achieve a part or all of the effects. Unless the technical features are explained in this specification as essential technical features, the technical features can be deleted as appropriate.

The entire disclosure of Japanese Patent Application Nos. 2016-080055, filed Apr. 13, 2016 and 2016-246192, filed Dec. 20, 2016 are expressly incorporated by reference herein.

What is claimed is:

1. A foot input device worn on a foot of a user and configured to output an operation signal used by an external apparatus, the foot input device comprising:
   an operation section configured to detect a state of a sole of the foot of the user and output the operation signal corresponding to the detected state of the sole of the foot,
   wherein the operation section detects, as the state of the sole of the foot, a load received from the sole of the foot of the user and outputs the operation signal corresponding to the detected load;
   a right-foot-load detecting section configured to detect a right load received from a sole of a right foot of the user; and
   a left-foot-load detecting section configured to detect a left load received from a sole of a left foot of the user,
   wherein the operation section outputs the operation signal corresponding to a change in the right load and a change in the left load.

2. The foot input device according to claim 1, wherein the operation section detects a distribution of the load in a predetermined detection range of the sole of the foot and outputs the operation signal corresponding to a change in the detected distribution of the load.

3. The foot input device according to claim 1, wherein
   the right-foot-load detecting section detects a distribution of the right load,
   the left-foot-load detecting section detects a distribution of the left load, and
   the operation section outputs the operation signal corresponding to the distribution of the right load and the distribution of the left load.

4. The foot input device according to claim 1, wherein
   the right-foot-load detecting section and the left-foot-load detecting section have a function of detecting a change in a position of the right foot and a change in a position of the left foot, and
   the operation section outputs the operation signal corresponding to the changes in the positions of the right foot and the left foot.

5. The foot input device according to claim 1, wherein the operation signal is a signal for changing a position of a pointer in an image displayed on an image display section of the external apparatus.

6. The foot input device according to claim 1, wherein the operation signal is a signal for setting a display image displayed on an image display section of the external apparatus.

7. The foot input device according to claim 1, wherein the operation section includes:
   a two-kind operation section worn on a first foot, which is one of a left foot and a right foot of the user, and configured to detect, as the state of the sole of the foot, a distribution of a load received from a sole of the first foot and output two kinds of operation signals, that is, a first operation signal and a second operation signal according to a change in the detected distribution of the load; and
   a one-kind operation section worn on a second foot, which is the other of the left foot and the right foot of the user, and configured to detect, as the state of the sole of the foot, a tilt of a sole of the second foot and output a third operation signal different from the two kinds of operation signals according to a change in the tilt.

8. The foot input device according to claim 7, wherein the first operation signal, the second operation signal, and the third operation signal are three kinds of operation signals corresponding to three kinds of operation used in the external apparatus.

9. The foot input device according to claim 8, wherein
the first operation signal and the second operation signal are signals corresponding to in-plane directions of a three-dimensional image displayed on an image display section of the external apparatus, and
the third operation signal is a signal corresponding to a depth direction of the three-dimensional image.

10. The foot input device according to claim 8, wherein the three kinds of operation signals are signals for changing a position of a pointer in an image displayed on an image display section of the external apparatus.

11. The foot input device according to claim 8, wherein
the external apparatus or another external apparatus connected to the external apparatus includes a moving device capable of moving in three-dimensional directions, and
the three kinds of operation signals are signals used as operation signals for moving the moving device in the three-dimensional directions.

12. A head-mounted display device comprising:
an image display section worn on a head of a user;
the foot input device according to claim 1; and
a display setting section configured to set a display image that the display setting section causes the image display section to display, wherein
the display setting section sets, according to an operation signal output from the foot input device, a display image that the display setting section causes the image display section to display.

13. The head-mounted display device according to claim 12, wherein, when an external apparatus communicatively connected to the head-mounted display device or another external apparatus connected via the external apparatus is operated, the operation signal output from the foot input device is delivered as the operation signal used in the external apparatus or the other external apparatus.

14. The head-mounted display device according to claim 12, wherein
the display setting section sets, according to a predetermined motion of the user, an input frame to be superimposed on the display image and sets a menu around a lower frame of the input frame,
the foot input device outputs the operation signal for the user to select a menu desired by the user, and
the display setting section sets, according to the operation signal output from the foot input device, a selection image indicating a state in which the selected menu is selected.

15. A head-mounted display device comprising:
an image display section worn on a head of a user;
a load-detection-type foot input section configured to detect a load of a sole of a foot of the user;
a display setting section configured to set, according to the load detected by the load-detection-type foot input section, a display image that the display setting section causes the image display section to display; and
an inertial sensor formed separately from the load-detection-type foot input section and the image display section,
wherein the display setting section sets the display image according to inertial data acquired by the inertial sensor and the load detected by the load-detection-type foot input section.

16. The head-mounted display device according to claim 15, further comprising:
a state specifying section configured to specify an activity state of the user, wherein
the display setting section sets, when the activity state is specified as not being a moving state in which the user is moving, the display image according to the load detected by the load-detection-type foot input section and continue, when the activity state is specified as being the moving state in which the user is moving, the setting of the display image already set.

17. The head-mounted display device according to claim 15, wherein
the load-detection-type foot input section detects a distribution of a load in a predetermined range, and
the display setting section causes the image display section to display a pointer image set in advance and changes a display position of the pointer image on the image display section according to a change in the distribution of the load detected by the load-detection-type foot input section.

18. The head-mounted display device according to claim 15, wherein
the load-detection-type foot input section includes:
a right-load-detection-type foot input section configured to detect a load of a right foot; and
a left-load-detection-type foot input section configured to detect a load of a left foot, and
the display setting section sets the display image according to a change in the load detected by the right-load-detection-type foot input section and a change in the load detected by the left-load-detection-type foot input section.

19. The head-mounted display device according to claim 18, wherein
the load-detection-type foot input section specifies changes in positions of the right-load-detection-type foot input section and the left-load-detection-type foot input section, and
the display setting section executes enlargement or reduction of at least a portion of the display image according to the changes in the positions.

20. The head-mounted display device according to claim 18, wherein the display setting section causes the image display section to display a pointer image set in advance, changes a position of the pointer image according to a distribution of a right load detected by the right-load-detection-type foot input section and a distribution of a left load detected by the left-load-detection-type foot input section, and differentiates a change amount of a display position of the pointer image that changes according to a change in the distribution of the right load and a change amount of a display position of the pointer image that changes according to a change in the distribution of the left load.

21. The head-mounted display device according to claim 15, wherein, when the display image can be set according to the load detected by the load-detection-type foot input section, the display setting section causes the image display section to display an image representing a position of the load-detection-type foot input section.

22. The head-mounted display device according to claim 21, wherein the load-detection-type foot input section has a surface shape corresponding to the sole of the foot of the user and a sensor capable of detecting a load is disposed in at least a part of the surface shape, and the display setting section causes the image display section to display an image representing a position of the sensor with respect to the surface shape as the image representing the position of the load-detection-type foot input section.

* * * * *